United States Patent
Kim et al.

(10) Patent No.: US 9,674,760 B2
(45) Date of Patent: Jun. 6, 2017

(54) METHOD AND DEVICE FOR PERFORMING DEVICE-TO-DEVICE COMMUNICATION IN WIRELESS COMMUNICATION SYSTEM

(71) Applicant: LG Electronics Inc., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 79 days.

(21) Appl. No.: 14/397,284

(22) PCT Filed: Apr. 29, 2013

(86) PCT No.: PCT/KR2013/003681
§ 371 (c)(1),
(2) Date: Oct. 27, 2014

(87) PCT Pub. No.: WO2013/162345
PCT Pub. Date: Oct. 31, 2013

(65) Prior Publication Data
US 2015/0146687 A1    May 28, 2015

Related U.S. Application Data

(60) Provisional application No. 61/639,105, filed on Apr. 27, 2012.

(51) Int. Cl.
*H04W 36/36* (2009.01)
*H04W 76/02* (2009.01)
*H04W 4/00* (2009.01)

(52) U.S. Cl.
CPC ........... *H04W 36/36* (2013.01); *H04W 4/005* (2013.01); *H04W 76/023* (2013.01)

(58) Field of Classification Search
None
See application file for complete search history.

(56) References Cited

U.S. PATENT DOCUMENTS

| | | | |
|---|---|---|---|
| 2007/0249347 A1* | 10/2007 | Saifullah | H04W 36/38 455/436 |
| 2010/0304748 A1* | 12/2010 | Henttonen | H04W 36/0077 455/436 |
| 2012/0026934 A1* | 2/2012 | Park | H04B 7/155 370/315 |
| 2012/0026976 A1* | 2/2012 | Chang | H04L 5/001 370/331 |
| 2013/0150051 A1* | 6/2013 | Van Phan | H04W 12/04 455/437 |

FOREIGN PATENT DOCUMENTS

| | | |
|---|---|---|
| KR | 10-2011-0089311 A | 8/2011 |
| WO | 2011087826 A1 | 7/2011 |
| WO | 2011109027 A1 | 9/2011 |

\* cited by examiner

*Primary Examiner* — Christopher Crutchfield
*Assistant Examiner* — Tito Pham
(74) *Attorney, Agent, or Firm* — Dentons US LLP

(57) ABSTRACT

A method for performing device-to-device (D2D) communication in a wireless communication system is provided. A master user equipment sets a D2D link with a slave user equipment. The master user equipment performs D2D communication with the slave user equipment through the D2D link. The master user equipment receives handover information of the slave user equipment from the slave user equipment. The master user equipment transmits the handover information of the slave user equipment to an evolved NodeB of a handover source cell.

12 Claims, 22 Drawing Sheets

METHOD AND DEVICE FOR PERFORMING DEVICE-TO-DEVICE COMMUNICATION IN WIRELESS COMMUNICATION SYSTEM

This Application is a 35 U.S.C. §371 National Stage entry of International Application No. PCT/KR2013/003681, filed Apr. 29, 2013, which claims benefit of Provisional Application No. 61/639,105 filed Apr. 27, 2012, both of which are incorporated by reference in their entirety herein.

BACKGROUND OF THE INVENTION

Field of the Invention

The present invention relates to a wireless communication system, and more particularly, to a method and apparatus for performing and supporting device-to-device (D2D) communication.

Related Art

Device-to-device (D2D) communication is a communication scheme in which a direct link is established between a plurality of devices (e.g., user equipments (UEs)) to directly exchange voice, data, or the like without an intervention of an evolved NodeB (eNB). The D2D communication may include UE-to-UE communication, peer-to-peer communication, etc. In addition, the D2D communication may be applied in machine-to-machine (M2M) communication, machine type communication (MTC), etc.

The D2D communication is considered as one method capable of solving an eNB overhead depending on data traffic which increases rapidly. For example, according to the D2D communication, unlike the conventional wireless communication system, data is exchanged between devices without an intervention of the eNB, thereby being able to decrease a network overload.

In addition, with the introduction of the D2D communication, there may be an advantageous effect such as a decrease in a procedure of the eNB, a decrease in power consumption of devices participating in D2D, an increase in a data transfer rate, an increase in a network accommodation capacity, a load distribution, a cell coverage expansion, etc.

SUMMARY OF THE INVENTION

The present invention provides a method for performing device-to-device (D2D) communication in a user equipment (UE) and for supporting D2D communication in a network. The present invention also provides a method of transmitting/receiving information for resource configuration, transmission power, charging, etc., as an elementary technology for D2D communication. The present invention also provides a method of transmitting/receiving information for D2D communication for a case where devices participating in D2D communication are connected to the same evolved NodeB (eNB) and for a case where the devices are connected to different eNBs. The present invention also provides a method of transmitting/receiving handover-related information for executing an effective handover while maintaining D2D communication in a case where one of devices participating in D2D communication executes a handover.

Technical problems to be solved in the present invention are not limited to the aforementioned technical problems, and other unmentioned technical problems can be apparently understood by those skilled in the art from descriptions below.

In an aspect, a method for performing device-to-device (D2D) communication in a wireless communication system is provided. The method includes establishing, by a master user equipment (UE), a D2D link with a slave UE, performing, by the master UE, the D2D communication with the slave UE through the D2D link, receiving, by the master UE from the slave UE, handover information of the slave UE, and transmitting, by the master UE to a base station of a handover source cell, the handover information of the slave UE.

In another aspect, a user equipment (UE) for performing device-to-device (D2D) communication with a slave UE in a wireless communication system is provided. The UE includes a reception module for receiving a signal from an external device, a transmission module for transmitting the signal to the external device, and a processor for controlling the apparatus having the reception module and the transmission module and configured to receive, from the slave UE, handover information of the salve UE, and transmit, to a base station of a handover source cell, the handover information of the slave UE.

The handover information of the slave UE may contain a UE identifier (ID) which is used by the slave UE in the handover source cell. 3. The UE ID may include a cell-radio network temporary identifier (C-RNTI).

The method may further include receiving, by the master UE from the base station of the handover source cell, handover information of a handover target cell. The handover information of the handover target cell may contain a UE ID which is used by the slave UE in the handover target cell.

The method may further includes transmitting, by the master UE to the slave UE, the handover information of the handover target cell. The handover information of the handover target cell may contain a physical cell ID of the handover target cell and/or a timing advance value for the handover target cell of the master UE.

The establishing of the D2D link may include transmitting, by the master UE to the base station of the handover source cell, a request message for a connection of the D2D link, wherein the request message contains a UE ID which is used by the slave UE in the handover source cell, receiving, by the master UE from the base station of the handover source cell, a physical downlink control channel (PDCCH) order in response to the request message, transmitting, by the master UE to the slave UE, a random access preamble through a physical random access channel (PRACH) on the basis of the PDCCH order, and receiving, by the master UE from the slave UE, a response for the random access preamble.

According to the present invention, a method for performing device-to-device (D2D) communication in a user equipment and for supporting D2D communication in a network can be provided.

Advantageous effects of the present invention are not limited to the aforementioned advantageous effects, and other unmentioned advantageous effects can be clearly understood by those skilled in the art from descriptions below.

BRIEF DESCRIPTION OF THE DRAWINGS

The above and other aspects, features and advantages of certain exemplary embodiments of the present invention will be more apparent from the following detailed description taken in conjunction with the accompanying drawings.

Figure 1A:
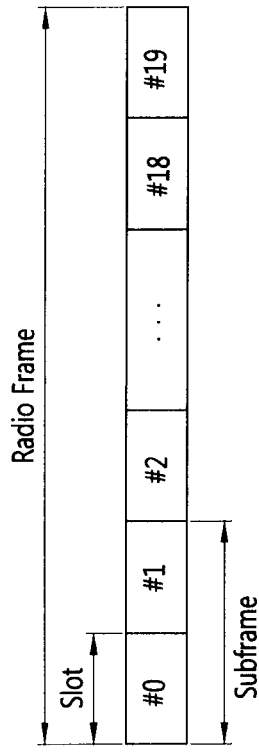
FIGS. 1A and B show structures of a radio frame.

DESCRIPTION OF EXEMPLARY
EMBODIMENTS

The following embodiments correspond to combinations of elements and features of the present invention in prescribed forms. It is able to consider that the respective elements or features are selective unless they are explicitly mentioned. Each of the elements or features can be implemented in a form failing to be combined with other elements or features. Moreover, it is able to implement an embodiment of the present invention by combining the elements and/or features together in part. A sequence of operations explained for each embodiment of the present invention can be modified. Some configurations or features of one embodiment can be included in another embodiment or can be substituted for corresponding configurations or features of another embodiment.

The present specification describes a relation of data transmission and reception between a base station and a terminal according to embodiments of the present invention. Herein, the base station has a meaning as a terminal node or a network for performing communication directly with the terminal. In this document, a specific operation described as being performed by the base station may be optionally performed by an upper node of the base station.

That is, it is apparent that various operations performed for communication with the base station in a network consisting of a plurality of network nodes including the base station can be performed by the base station or other network nodes other than the base station. A 'base station (BS)' may be replaced with other terms such as a fixed station, a Node B, an eNode B (eNB), an access point (AP), etc. A relay may be replaced with other terms such as a relay node (RN), a relay station (RS), etc. In addition, a 'terminal' may be replaced with other terms such as a user equipment (UE), a mobile station (MS), a mobile subscriber station (MSS), a subscriber station (SS). etc.

Specific terms used herein are provided to help understanding of the present invention. The terms may be replaced with other terms without departing from the technical features of the present invention.

In some cases, to avoid conceptual ambiguity of the present invention, well-known structures and apparatuses may be omitted, or a block diagram may be illustrated by focusing on a core function of each structure and apparatus. In addition, like reference numerals are used to indicate like elements throughout the present invention.

The embodiments of the present invention can be supported by standard documents disclosed in at least one of an institute of electrical and electronics engineers (IEEE) 802 system, a $3^{rd}$ generation partnership project (3GPP) system, a 3GPP long term evolution (LTE) and LTE-advanced (LTE-A) system, and a 3GPP2 system. That is, among the embodiments of the present invention, unexplained steps or parts can be supported by the aforementioned documents to clarity the technical features of the present invention. In addition, all terms disclosed in the present document can be explained by the aforementioned standard document.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE. WiMAX can be explained by an IEEE 802.16e standard (WirelessMAN-OFDMA Reference System) and an evolved IEEE 802.16m standard (WirelessMAN-OFDMA Advanced system). Although the following description focuses on 3GPP LTE and 3GPP LTE-A systems for clarity, the technical features of the present invention are not limited thereto.

A radio frame structure of a 3GPP LTE system will be described with reference to FIG. 1.

In a cellular orthogonal frequency division multiplex (OFDM) radio packet communication system, uplink/downlink data packet transmission is achieved on a subframe basis, and one subframe is defined as a specific time duration including a plurality of OFDM symbols. A 3GPP LTE standard supports a type-1 radio frame structure applicable to frequency division duplex (FDD) and a type-2 radio frequency structure applicable to time division duplex (TDD).

Figure 1B:
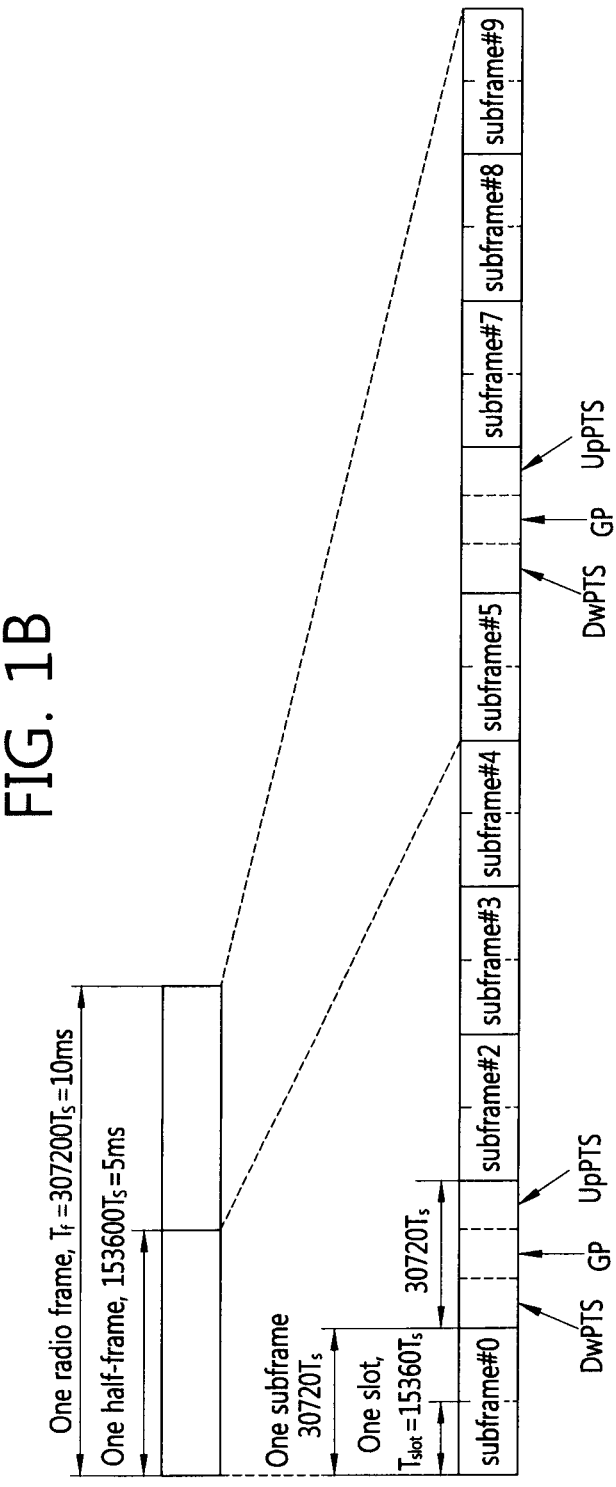

A subfigure (a) of FIG. 1 shows a structure of a type-1 radio frame. One radio frame consists of 10 subframes. One subframe consists of two slots in a time domain. A time for transmitting one subframe is defined as a transmission time interval (TTI). For example, one subframe may have a length of 1 millisecond (ms), and one slot may have a length of 0.5 ms. One slot includes a plurality of SC-FDMA symbols in a time domain and a plurality of resource blocks (RBs) in a frequency domain. In a 3GPP LTE system, since OFDMA is used in a downlink, an OFDM symbol represents one symbol duration. The OFDM symbol can also be referred to as an SC-FDMA symbol or a symbol duration. The RB is a resource allocation unit, and includes a plurality of consecutive subcarriers in one slot.

The number of OFDM symbols included in one slot may vary depending on a configuration of a cyclic prefix (CP). The CP includes an extended CP and a normal CP. For example, if the OFDM symbol is constructed of the normal CP, the number of OFDM symbols included in one slot may be 7. If the OFDM symbol is constructed of the extended CP, since a length of one OFDM symbol is increased, the number of OFDM symbols included in one slot is less than that of the normal CP. In case of the extended CP, the number of OFDM symbols included in one slot may be 6 for example. When a channel state is unstable, for example, when a UE moves at a rapid speed, the extended CP can be used to further decrease an inter-symbol interference.

A subfigure (b) of FIG. 1 shows a structure of a type-2 radio frame. The type-2 radio frame consists of two half-frames. Each half-frame consists of 5 subframes, a downlink pilot time slot (DwPTS), a guard period (GP), and an uplink pilot time slot (UpPTS). Among them, one subframe consists of two slots. The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink. Meanwhile, one subframe consists of two slots irrespective of the radio frame type.

The radio frame structure is for exemplary purposes only, and thus the number of subframes included in the radio frame or the number of slots included in the subframe, and the number of symbols included in the slot may change in various manners.

Figure 2:
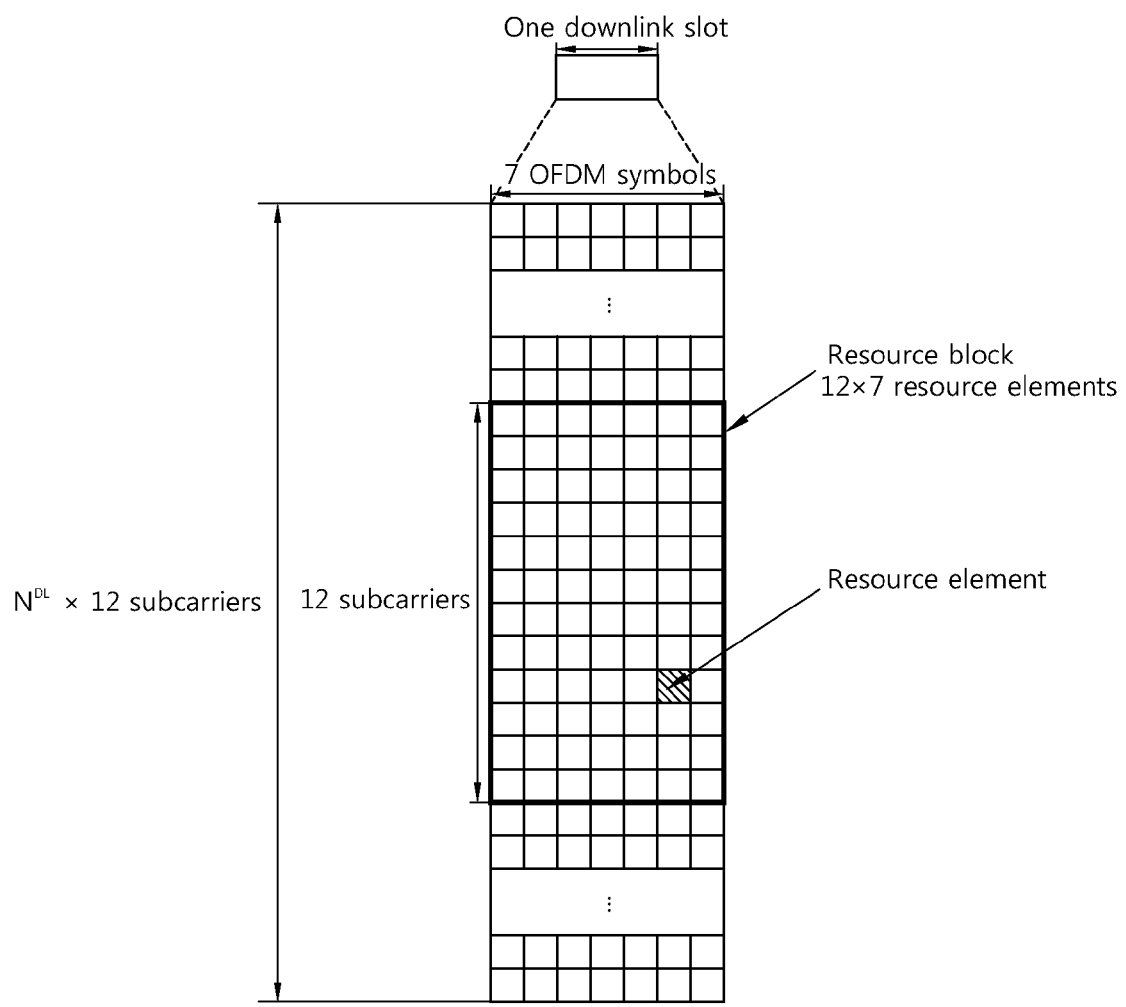
FIG. 2 shows a resource grid in a downlink slot.

FIG. 2 shows a resource grid in a downlink (DL) slot. Although one DL slot includes 7 OFDM symbols in a time domain, and one resource block (RB) includes 12 subcarriers in a frequency domain, the present invention is not limited thereto. For example, one slot includes 7 OFDM symbols in a normal CP case, whereas one slot includes 6 OFDM symbols in an extended CP case. Each element on the resource grid is referred to as a resource element (RE). One RB includes 12×7 REs. The number $N^{DL}$ of RBs included in the DL slot depends on a DL transmission bandwidth configured in a cell. A UL slot and a DL slot may have the same structure.

Figure 3:
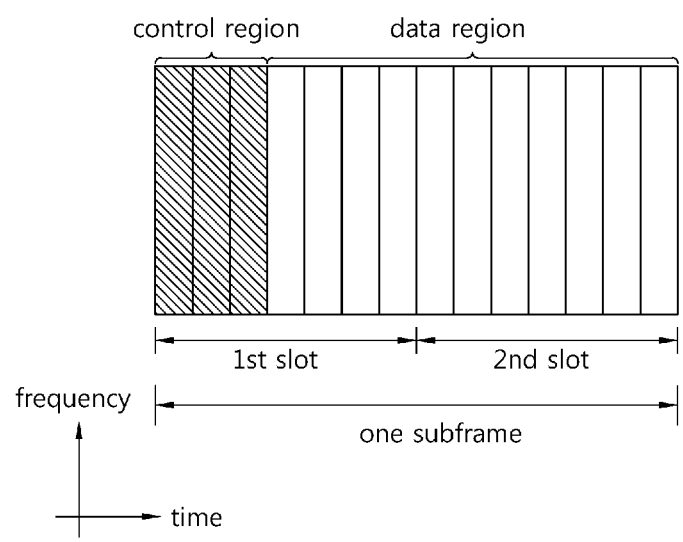
FIG. 3 shows a structure of a downlink subframe.

FIG. 3 shows a structure of a downlink subframe. Up to first three OFDM symbols of a $1^{st}$ slot in one subframe correspond to a control region to which a control channel is allocated. The remaining OFDM symbols correspond to a data region to which a physical downlink shared channel (PDSCH) is allocated. Examples of downlink control channels used in the 3GPP LTE system include a physical control format indicator channel (PCFICH), a physical downlink control channel (PDCCH), a physical hybrid-ARQ indicator channel (PHICH), etc. The PCFICH is transmitted in a $1^{st}$ OFDM symbol of a subframe, and includes information regarding the number of OFDM symbols used for transmission of control channels in the subframe. The PHICH is a response of uplink transmission, and includes an HARQ ACK/NACK signal. Control information transmitted through the PDCCH is referred to as downlink control information (DCI). The DCI includes uplink or downlink scheduling information or includes an uplink transmit power control command for any UE group. A physical downlink control channel (PDCCH) can carry a downlink shared channel (DL-SCH)'s resource allocation and transmission format, uplink shared channel (UL-SCH)'s resource allocation information, paging information on a paging channel (PCH), system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs. A BS determines a PDCCH format according to downlink control information (DCI) to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information (more specifically, system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
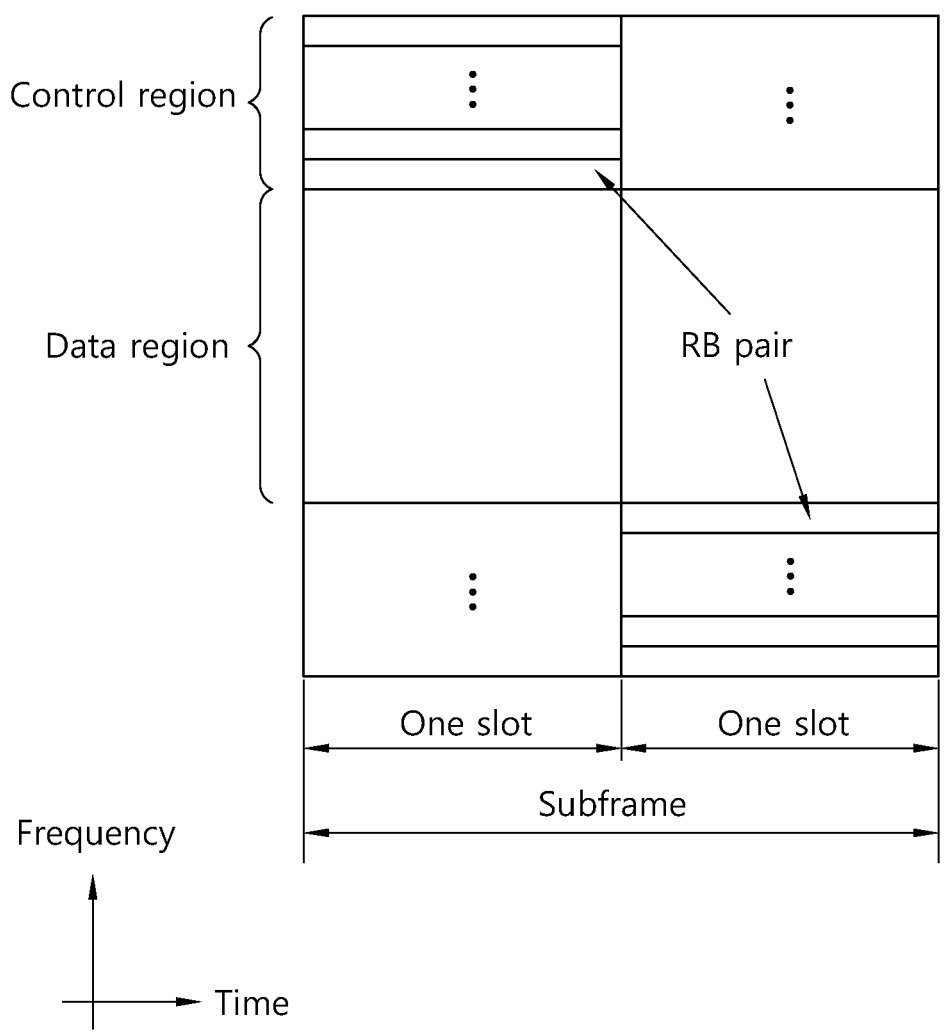
FIG. 4 shows a structure of an uplink subframe.

FIG. 4 shows a structure of an uplink subframe. The uplink subframe can be divided into a control region and a data region. A physical uplink control channel (PUCCH) for carrying uplink control information is allocated to the control region. A physical uplink shared channel (PUSCH) for carrying data is allocated to the data region. In order to maintain a single-carrier property, one UE does not transmit the PUCCH and the PUSCH simultaneously. The PUCCH for one UE is allocated to a resource block pair in a subframe. Resource blocks belonging to the resource block pair occupy different subcarriers as to two slots. This is called that a resource block pair allocated to the PUCCH is frequency-hopped in a slot boundary.

Figure 5A:
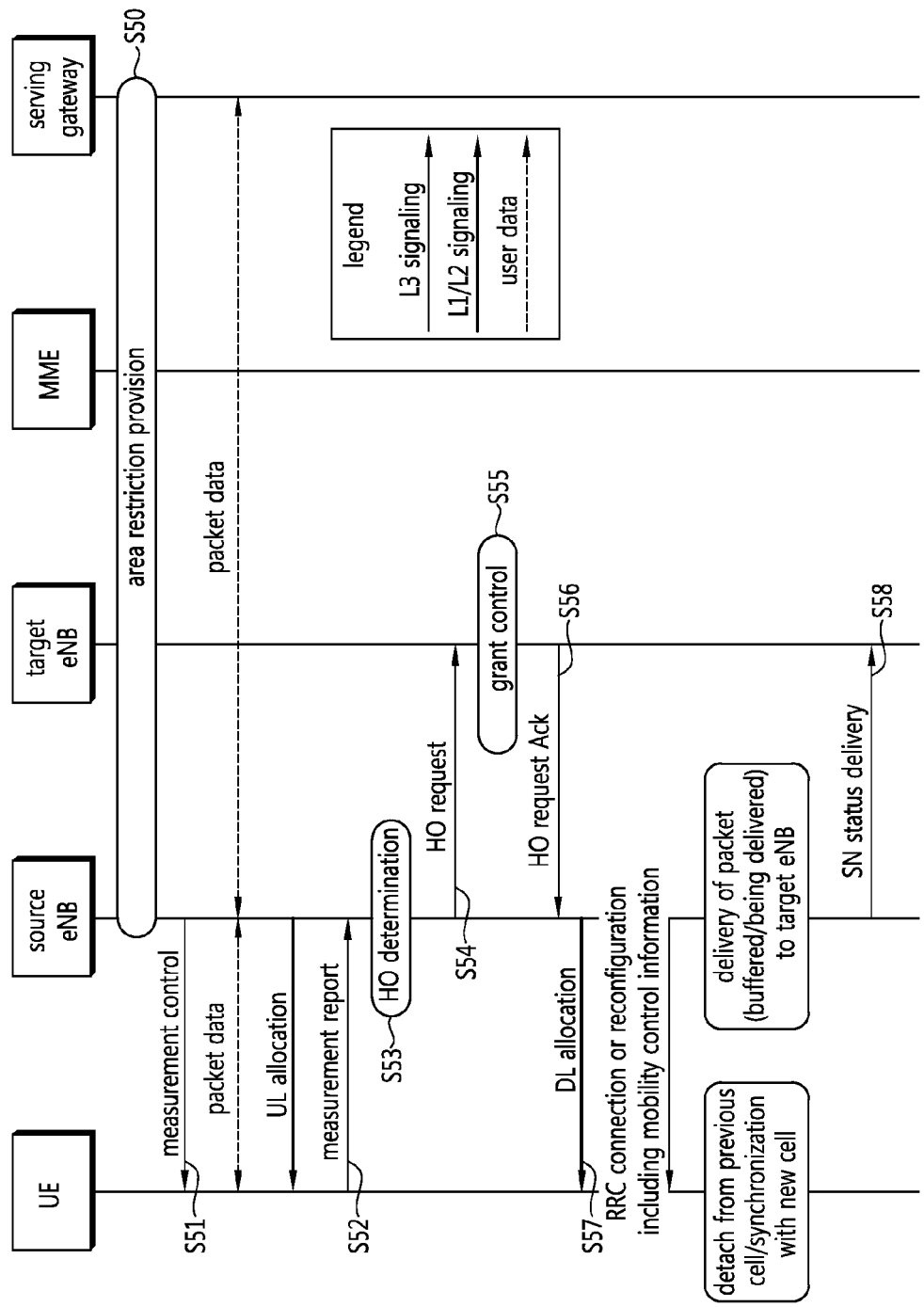
FIGS. 5A and 5B show a typical handover procedure.
Figure 5B:
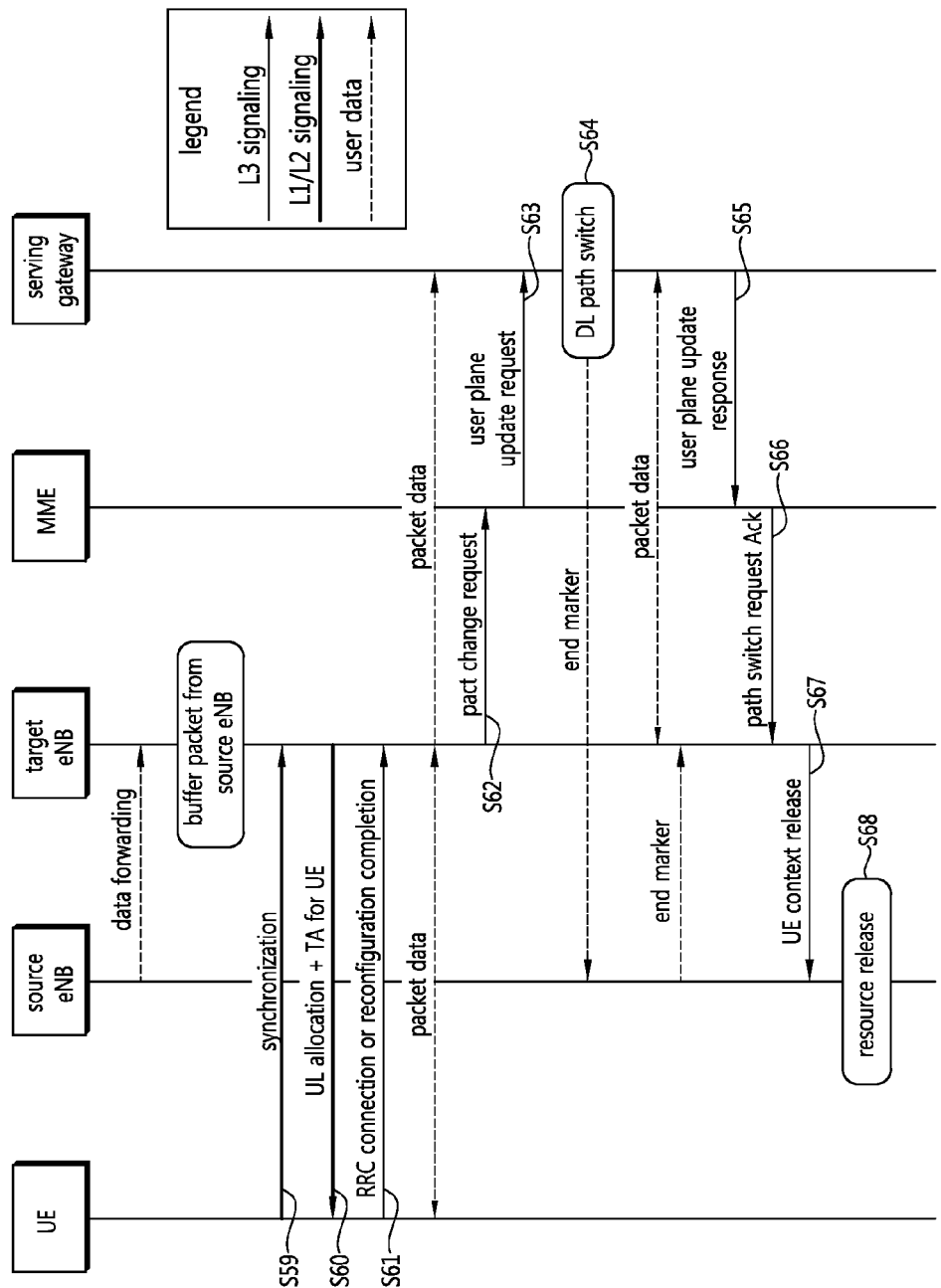

FIGS. 5A and 5B show a typical handover procedure. The section 10.1.2.1 of 3GPP (3rd Generation Partnership Project) TS 36.300 V10.7.0 (2012-03) "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)" may be incorporated herein by reference.

First, a handover preparation process is described in FIG. 5A.

In step S50, area restriction information is provided. A UE context in a source eNB includes information regarding a roaming restriction provided in a connection establishment or last timing advance (TA) update.

In step S51, the source eNB configures a UE measurement process according to the area restriction information, and transmits a measurement control message to a UE through L3 signaling. The measurement provided by the source eNB may assist a function of controlling a connectivity, mobility of the UE. Meanwhile, packet data may be exchanged between the UE and the source eNB or between the source eNB and a serving gateway.

In step S52, the UE transmits a measurement report to the source eNB through the L3 signaling according to a rule determined by system information or the like.

In step S53, the source eNB performs a handover decision on the basis of the measurement report and radio resource management (RRM) information.

In step S54, the source NB transmits a handover request message to the target eNB through the L3 signaling, and delivers necessary information so that a handover is prepared in a target side. In this case, the necessary information may include a UE X2 signaling context reference in the source eNB, a UE S1 EPC signaling context reference, a target cell identifier (ID), a KeNB, an RRC context including a cell-radio network temporary identifier (C-RNTI) of the UE in the source eNB, an application server (AS) configuration, an E-UTRAN radio access bearer (E-RAB) context, a source cell's physical layer ID, a MAC for possible available radio link failure (RLF) recovery, etc. The UE X2/UE S signaling context reference allows the target eNB to perform addressing on an EPC with respect to the source eNB. The E-RAB context includes necessary radio network layer (RNL) addressing information, transport network layer (RNL) addressing information, and an E-RAB's quality of service (QoS) profile.

In step S55, a target eNB performs a grant control. The grant control may be performed on the basis of E-RAB QoS information received to increase a handover success rate if a resource is granted by the target eNB. The target eNB configures a necessary resource according to the received E-RAB QoS information, and reserves a C-RNTI, and optionally, an RACH preamble. The AS configuration to be used in the target cell may be configured (established) independently, or may be configured (reconfigured) in a delta with respect to the AS configuration used in the source cell.

In step S56, the target eNB transmits a handover request acknowledge message to the source eNB through L3 signaling, and prepares for the handover. The handover request acknowledge message may include a transparent container to be transmitted to the UE as an RRC message to perform the handover. The transparent container may include a new C-RNTI, a target eNB security algorithm identifier for a selected security algorithm, a dedicated RACH preamble, and if possible, other parameters such as an access parameter, SIB, etc. The handover request acknowledge message may include RNL/TNL information for a forwarding tunnel when necessary. Meanwhile, data forwarding may be initiated as soon as the source eNB receives the handover request acknowledge message or as soon as transmission of the handover command is initiated in a downlink.

In step S57, the target eNB transmits an RRC connection reconfiguration message including mobility control information to the UE to execute the handover. The source eNB performs a protection and encryption operation necessary for the message. The UE receives an RRC connection reconfiguration message together with necessary parameters. The necessary parameters may include a new C-RNTI, a target eNB security algorithm identifier, and optionally, a dedicated RACH preamble, and target eNB SIBs. The UE receives a handover execution command from the source eNB. The UE does not have to delay a handover execution to deliver an HARQ/ARQ response to the source eNB.

Hereinafter, the handover execution process is described.

When the handover execution process starts, the UE is detached from an old cell, and is synchronized with a new cell. In addition, the source eNB delivers to the target eNB a buffered packet and a packet being delivered.

In step S58, the source eNB transmits an SN status delivery message to the target eNB in order to deliver an uplink (UL) PDCP SN receiver status and a downlink (DL) PDCP SN transmitter status of E-RAB of which a PDCP status is maintained (i.e., for an RLC acknowledge mode (AM)). If such an SDU exists, the UL PDCH SN receiver status may include at least one of a PDCH SN of a first lost UL SDU and a bitmap of a reception status of a UL SDU sequence which needs to be retransmitted by the UE in the target cell. The DL PDCP SN transmitter status indicates a next PDCP SN allocated to new SDUs in which the target eNB does not yet have a PDCN SN. If any E-RAB of the UE does not maintain the PDCP status, the source eNB may skip transmission of this message.

FIG. 5B is continued from FIG. 5A.

In step S59, the UE performs a synchronization to the target eNB, and accesses the target cell through an RACH. If a dedicated RACH preamble is indicated in mobility control information, an access to the target cell through the RACH may be a contention-free process. Alternatively, if the dedicated preamble is not indicated, the access to the target cell through the RACH may be a contention-based process. The UE derives target eNB specific keys, and configures a selected security algorithm to be used in the target cell.

In step S60, the target eNB responds as to a UE synchronization through a UL allocation and a timing advance.

In step S61, if the UE successfully accesses the target cell, the UE confirms a handover, and transmits an RRC connection reconfiguration complete message including C-RNTI to the target eNB to indicate the completion of the handover procedure for the UE. If possible, an uplink buffer status report may be transmitted together with the RRC connection reconfiguration complete message. The target eNB confirms the C-RNTI in the RRC connection reconfiguration complete message. Then, the target eNB can transmit data to the UE. Packet data is exchanged between the UE and the target eNB.

Hereinafter, the handover completion process is described.

In step S62, the target eNB transmits a path switch message to an MME to report that the UE changes a cell.

In step S63, the MME transmits a user plane update request message to the serving gateway.

In step S64, the serving gateway changes a downlink data path to the target side. The serving gateway may transmit one or more end marker packets to the source eNB on the existing path, and may release all user plane (i.e., U-plane)/TNL resources directed to the source eNB.

In step S65, the serving gateway transmits a user plane update response message to the MME.

In step S66, the MME transmits a path switch accept message to the target eNB to confirm the path switch message.

In step S67, the target eNB transmits a UE context release message to the source NB to report a handover success and to trigger a resource release.

In step S68, if the UE context release message is received, the source eNB may release a UE context-related radio resource and a control plane (i.e., C-plane)-related resource. Every data forwarding which is continuously being performed can be continued.

D2D Communication

In general, D2D communication is used restrictively as a term indicating object-to-object communication or object-to-object intelligent communication. However, the D2D communication of the present invention may include not only communication of a simple device having a communication function but also communication between various types of devices having the communication function, such as a smart phone or a personal computer.

Figure 6:
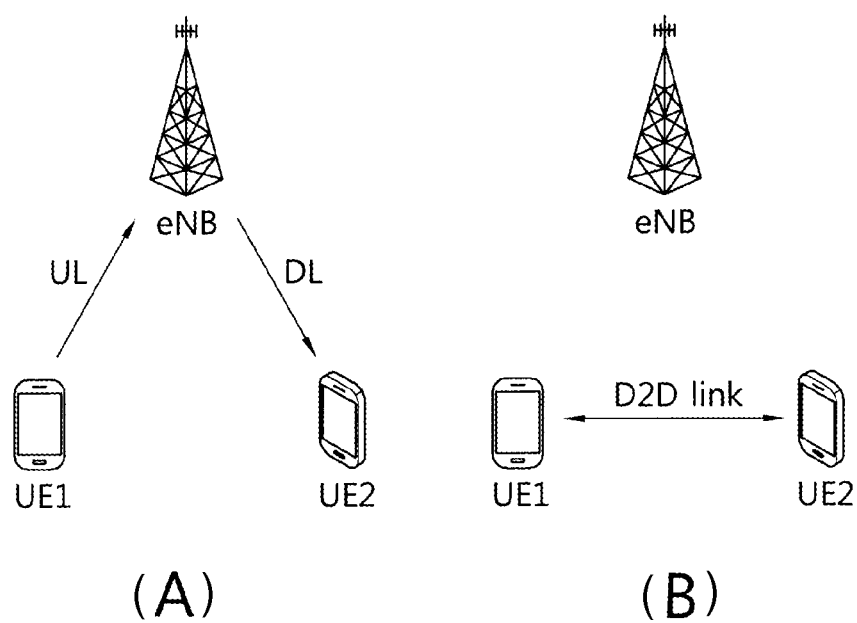
FIGS. 6A and B show concepts of device-to-device (D2D) communication.

FIG. 6 shows the concept of D2D communication.

FIG. 6(*a*) shows the conventional eNB-based communication mechanism in which a UE1 can transmit data to an eNB in an uplink and the eNB can transmit data to the UE1 in a downlink. Such a communication mechanism may be called an indirect communication mechanism using the eNB. The indirect communication mechanism may be related to a Un link (it may be called a backhaul link, as a link between eNBs or a link between an eNB and a relay), and/or a Uu link (it may be called an access link, as a link between an eNB and a UE or a link between a relay and a UE).

FIG. 6(*b*) shows a UE-to-UE communication mechanism as an example of D2D communication. Herein, data exchange between UEs can be performed without an intervention of an eNB. Such a communication scheme may be called a direct communication mechanism between devices. In the direct communication mechanism, a link between the devices may be defined as a D2D link (or a Ud link). The D2D direct communication mechanism has an advantage in that a latency is decreased in comparison with the conventional indirect communication mechanism using the eNB and in that less radio resources are used.

Although direction communication between two devices in D2D communication is described for clarity hereinafter, the present invention is not limited thereto. Thus, the same principle described in the present invention may also be applied to D2D communication between two or more devices.

1. D2D Resource Configuration

Since D2D communication is performed by reusing a resource of the existing wireless communication network (e.g., 3GPP LTE or 3GPP LTE-A), an interference or disruption must be avoided between the existing wireless communication networks. That is, actual data transmission/reception between devices needs to be configured by distinguishing a resource for D2D communication from a resource for the existing wireless communication (i.e., indirect communication using an eNB), even if not using the eNB.

Specifically, an operation of performing D2D direct communication and an operation of performing indirect communication using the eNB may have an effect on each other. For example, a UE uses a downlink carrier (or a downlink frequency band) and an uplink carrier (or an uplink frequency band) which are distinguished from each other. In this case, although a UE having a half-duplex function has a reception function and a transmission function, transmission and reception cannot be performed simultaneously. Such a UE cannot perform transmission to a D2D counterpart on the same carrier at the same time of performing the reception operation. Similarly, the UE cannot perform reception from the D2D counterpart on the same carrier simultaneously while performing the transmission operation. Therefore, due to a restriction in which the UE cannot have the full-duplex function, it is assumed that an operation of performing D2D direct communication and an operation of performing indirect communication using the eNB have an effect on each other. As such, if a half-duplex communication UE is assumed, as a method in which the D2D direct communication and the indirect communication using the eNB can coexist, a configuration can be considered in which a resource for the D2D link communication is distinguished from a resource for Uu/Un link communication.

For example, TDM may be applied between the D2D link communication and the Uu/Un link communication. That is, during a time resource (e.g., subframe) duration in which the D2D link communication is achieved, communication between the eNB and the UE (e.g., PDSCH transmission/reception or PUSCH transmission/reception) may not be scheduled. In addition, a time resource for the D2D link communication may be predetermined, and the D2D link communication may be allowed to be performed only using a D2D dedicated resource. In addition, the time resource which cannot be used for the D2D link communication may be predetermined, and the D2D link communication may be allowed to be performed using a time resource other than the predetermined time resource.

Although a D2D resource in a time domain is primarily described in the above example for clarity, a resource in which D2D link communication is allowed and/or a resource in which D2D link communication is prohibited may be configured in a frequency domain and/or spatial domain (e.g., an antenna port or a layer domain). For example, a specific resource block may be configured as a frequency resource in which the D2D link communication is performed. In addition, it may be configured in a specific frequency resource such that the D2D link communication is performed only in a specific time domain. For example, a D2D dedicated RB may be configured with a period of 8 ms, and it may be scheduled to perform D2D communication only in this region and in this time period.

The UE may determine information on a resource in which D2D link communication is implicitly prohibited from different information. For example, among downlink subframes, a time/frequency/spatial resource in which system information, a synchronization signal, a control channel, a reference signal, etc., are transmitted may be determined by the UE as a resource region in which the D2D link communication is prohibited. Alternatively, information on a resource in which the D2D link communication is allowed and/or a resource in which the D2D link communication is prohibited may be indicated explicitly to the UE through signaling from a network.

For example, a period, resource, and retransmission method for the D2D link communication may be signaled to the UE which requests the D2D link communication.

Accordingly, the UE may be allowed to perform the D2D link communication on a specific resource (e.g., a time/frequency/spatial resource). For this, a configuration signaling method for the D2D link communication may be defined. For example, a period and offset of a subframe which can be used in the D2D link communication through higher layer signaling may be designated in the UE, and an activation/release of the D2D link communication may be indicated dynamically to the UE through a control channel. Information on an RB, MCS, etc., allocated for the D2D link communication may be included in control information indicated dynamically. Accordingly, the D2D resource configuration may be semi-statically configured similarly to a resource configuration for an SPS service.

2. D2D Link Transmission and Uu/Un Link Transmission

A carrier (or frequency band) used in D2D link communication may be defined as either an uplink carrier or a downlink carrier, or both of them may be used for the D2D link communication. In addition, in a system supporting a carrier aggregation, a carrier for the D2D link communication may be configured separately from a carrier for Uu/Un link communication.

In addition, since essential signals/information such as a broadcast signal, a control channel, a reference signal, etc., are present on a downlink carrier in communication between an eNB and a UE, it is difficult to be used for D2D link communication in comparison with an uplink carrier on which such signals/information are not present. Therefore, it may be assumed that the uplink carrier is used for the D2D link communication. Herein, it may be considered a case where transmission on a Uu/Un link from the UE to the eNB and transmission on a D2D link from the UE to another UE are simultaneously performed and a case where the transmissions are not simultaneously performed.

When the transmission on the Uu/Un link and the transmission on the D2D link are not allowed to be performed simultaneously in one UE, each transmission may be performed on an allowed resource according to the aforementioned D2D resource configuration.

Meanwhile, when the simultaneous transmissions on the Uu/Un link and on the D2D link are allowed in one UE, there may be case where a PUCCH on the Uu/Un link from the UE to the eNB (hereinafter, called a macro PUCCH) and a PUCCH on the D2D link from the UE to another UE (hereinafter, called a D2D PUCCH) are transmitted in the same subframe. In general, since transmission power of the macro PUCCH is significantly greater than D2D PUCCH transmission power, if simultaneous transmission thereof is allowed, D2D PUCCH transmission may experience a strong interference.

The eNB may configure the macro PUCCH transmission power to the UE, whereas the D2D PUCCH transmission power may be autonomously determined by the UE by considering a path loss or the like on the D2D link. Therefore, it is proposed a method in which the UE which performs the D2D link communication feeds back D2D PUCCH transmission power configuration information to the eNB. Accordingly, the eNB may configure the macro PUCCH transmission power by considering the D2D PUCCH transmission power (for example, so that an interference on the D2D PUCCH is decreased).

In addition, the D2D PUCCH transmission power configuration information which is fed back by the D2D UE may be used in an operation which prevents different types of PUCCHs from being simultaneously transmitted in the same subframe. Even if the UE has a capability of simultaneously transmitting the macro PUCCH and the D2D PUCCH, the D2D link communication may not be correctly performed if an interference on the D2D PUCCH is strong as described above.

Accordingly, it may be preferable that one type of PUCCH is transmitted in one subframe. For this, the eNB may assign a priority of transmission for each of the macro PUCCH and the D2D PUCCH by collectively considering the macro PUCCH transmission power configuration information and the D2D PUCCH transmission power configuration information, and may report this to the UE. In addition, the D2D UE may determine which one is transmitted preferentially between the D2D PUCCH and the macro PUCCH, by collectively considering its D2D PUCCH transmission power information and macro PUCCH transmission power information indicated from the eNB. Accordingly, at an occurrence of a situation where different types of PUCCHs are transmitted simultaneously, the UE may operate to transmit a PUCCH to which a high priority is assigned, and an interference between the D2D link and the Uu/Un link may be decreased.

The aforementioned example of the present invention is not limited only to the macro PUCCH transmission and/or the D2D PUCCH transmission, and the same principle proposed in the present invention may be applied to an uplink transmission power control of a UE which performs D2D.

3. Transmission/Reception of D2D Communication-Related Information

Figure 7:
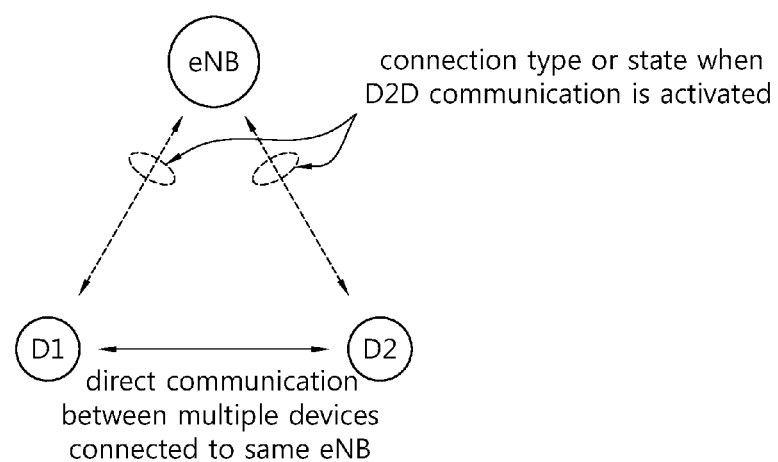
FIG. 7 shows an example of direct communication between two devices D1 and D2 connected to the same evolved NodeB (eNB).

FIG. 7 shows an example of direct communication between two devices D1 and D2 connected to the same eNB.

In the example of FIG. 7, if D2D communication is activated, the D1 and the D2 may be in a state where each device is connected with the eNB, but such a connection may not be maintained. It is assumed in the example of FIG. 7 that, even if the connection between the eNB and the D1 or D2 is not maintained, each device exists in a coverage of the eNB.

When devices participating in the D2D communication are connected to the same eNB, since the D2D-related configuration described in the aforementioned examples (e.g., a D2D resource configuration, a configuration regarding Uu/Un link transmission and D2D link transmission, etc.) are determined in the same single entity, the D2D communication may be performed basically according to the aforementioned signaling method.

In addition, the D2D communication-related information for correctly performing D2D communication may be transmitted/received between the D2D devices D1 and D2 and the eNB. For example, the D2D communication-related information may be charging-related information. The eNB is not involved in the D2D link communication itself, but since the D2D communication is performed by using a resource for the existing wireless network, an operator which provides the wireless network may charge for the D2D link communication. To support this, a time of activating (or starting) the D2D communication, a time of releasing (or ending) the D2D communication, a duration of maintaining the D2D communication, a size of a frequency resource used in the D2D communication, information regarding an amount of transmitted/received data, etc., may be provided from the D2D device to the eNB. For this, physical layer signaling and/or upper layer signaling may be defined and used.

Figure 8:
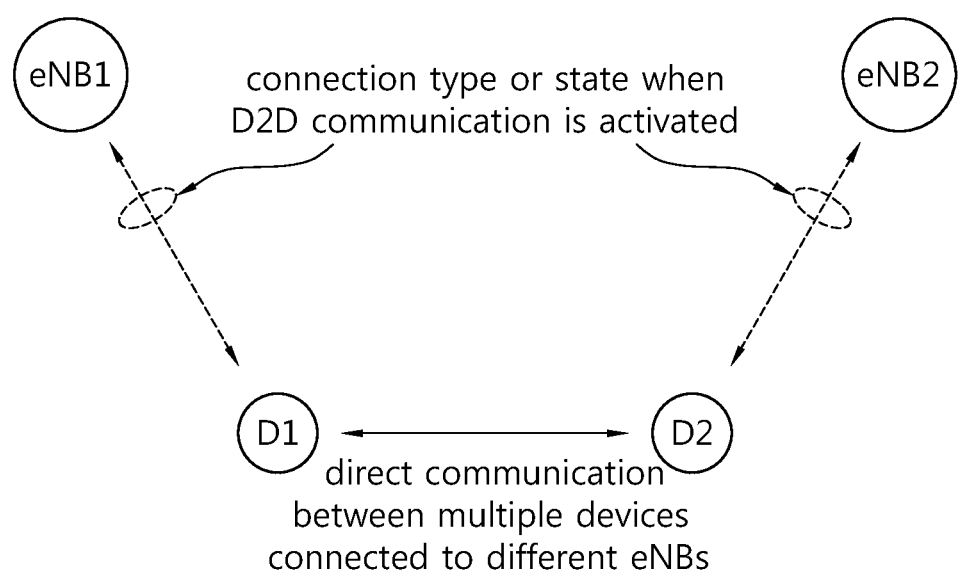
FIG. 8 shows an example of direct communication between two devices D1 and D2 connected to different eNBs.

FIG. 8 shows an example of direct communication between two devices D1 and D2 connected to different eNBs.

In the example of FIG. 8, if D2D communication is activated, the D1 may be connected to an eNB1 and the D2 may be connected to an eNB2, but such a connection may not be maintained. It is assumed in the example of FIG. 8 that, even if one or more of the connection between the eNB1 and the D1 and the connection between the eNB2 and the D2 is not maintained, the devices exist in a coverage of the respective eNBs.

When devices participating in the D2D communication are connected to different eNBs, since the D2D-related configuration described in the aforementioned examples (e.g., a D2D resource configuration, a configuration regarding Uu/Un link transmission and D2D link transmission, etc.) are determined in different entities, D2D communication-related information needs to be exchanged in addition to the aforementioned signaling method.

For example, a resource region for D2D link communication signaled by the eNB1 to the D1 and information such as MCS or the like must be equally provided as to the D2 which performs directly communication with the D1 (herein, although information on the D1 is identical in content to information on the D2 in practice, if a cell-specific parameter is different in a cell in which each device exists, corresponding information may be expressed differently). Accordingly, the present invention proposes a method of exchanging and determining D2D-related information of the eNB1 (or D1) and D2D-related information of the eNB2 (or D2).

For example, the eNB1 may report D2D communication-related information configured to the eNB2 (ultimately to the D2). For this, a specific signaling method may be applied. For example, a PDCCH order which indicates the UE to starts a random access process may be modified such that, if fields in a DCI format are set to a predetermined specific value, it can be recognized that corresponding control information is signaling for providing D2D-related information from the eNB1 to the eNB2 (or D2). Alternatively, if it is determined that D2D communication is activated through a handshaking process between eNBs, a signaling method may be applied in which D2D communication-related information requested by each eNB is exchanged. Hereinafter, examples of the present invention regarding detailed processes of transmitting/receiving D2D communication-related information are described.

Figure 9:
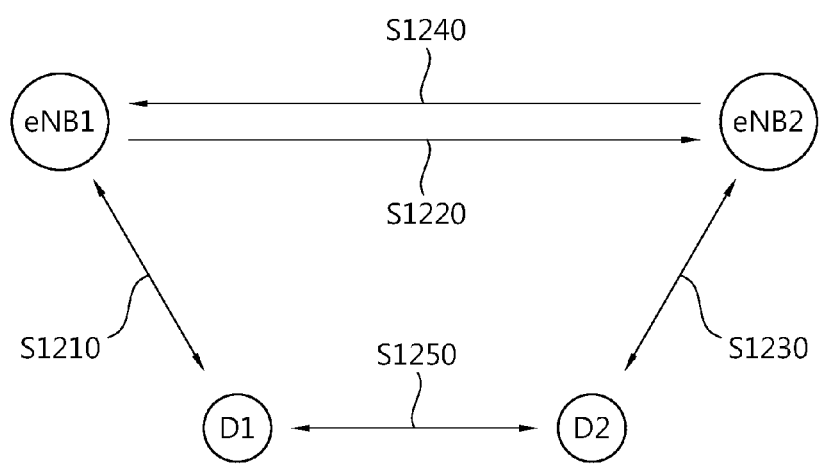
FIG. 9 shows a method of transmitting/receiving D2D communication-related information according to an embodiment of the present invention.

FIG. 9 shows a method of transmitting/receiving D2D communication-related information according to an embodiment of the present invention. All or some of steps of FIG. 9 may constitute a separate embodiment of the present invention. That is, an essential configuration of the present invention is not limited to include all of the steps of FIG. 9, and thus it may be interpreted that only some of the steps constitute the essential configuration for achieving the purpose of the present invention. Hereinafter, examples of the present invention are described according to an overall flow for clarity.

In step S1210, the eNB1 may provide the D1 with resource configuration information for D2D link communication (i.e., direct communication between the D1 and the D2). D2D resource configuration information for the D1 may be predetermined and may be broadcast when the D1 is attached to a cell of the eNB1. Alternatively, if the D1 transmits to the eNB1 a message (e.g., a scheduling request (SR)) for ensuring a D2D resource, the D2D resource configuration information may be provided from the eNB1 to the D1 in response thereto. The D2D resource configuration information may be defined as a cell-specific parameter, a UE group-specific parameter, or a UE-specific parameter.

In step S1220, the eNB1 may transmit to the eNB2 a message (e.g., a D2D request message) for requesting D2D communication. In this case, the message from the eNB1 to the eNB2 may inquire whether D2D communication between the D1 and the D2 is possible, or may include information required for this.

In step S1230, the eNB2 may send to the D2 a checking signal (e.g., a D2D availability checking signal) to recognize whether the D2 can participate in D2D communication. When the D2 can perform D2D communication, the D2 may feed back information required by the checking signal to the eNB2.

In step S1240, the eNB2 may respond to the eNB1 whether D2D is allowed, by considering a situation of a cell operation and a situation of the D2. Specifically, the eNB2 may transmit information received from the D2 and a cell-specific D2D resource region (e.g., a time duration, a period, a frequency resource, etc.) to the eNB1. If the D2D availability resource or the like determined by the eNB2 is matched to the D2D communication-related information requested by the eNB1, a confirmation signal may be simply transmitted. If the information requested by the eNB1 is not matched to the information available in the eNB2, partial or conditional confirmation signals may be transmitted to modify a part thereof. Accordingly, handshaking for a configuration of the D2D communication-related information may be performed between the eNB1 and the eNB2.

For example, in a case where a resource for D2D communication is configured as a fixed specific region for each cell, if a cell of the eNB1 and a cell of the eNB2 have different resources for the D2D communication, the D2D communication cannot be performed.

Therefore, an operation for coordinating the resource region for the D2D communication and an information exchange may be performed in any one side or in both sides. For example, information regarding whether the D2D communication is possible, whether a reserved resource is available, etc., may be exchanged between eNBs, and the eNB may deliver corresponding information to the UE. If the coordination for the D2D communication-related configuration between the eNBs is successfully performed, the eNB1 and the eNB2 can signal D2D enabling information to each of the D1 and the D2 (not shown). In addition, the D2D enabling information may be transmitted also to a UE which does not participate in D2D.

In step S1250, the D1 and the D2 may perform direct communication by using a designated method in a resource region designated for D2D communication. In addition, the D1 and/or the D2 may report charging-related information (e.g., a time duration in which D2D communication is performed, a resource region, a data amount, etc,) for D2D communication to the eNB1 and/or the eNB2 (not shown).

In the aforementioned example of the present invention, an additional embodiment of the present invention for decreasing a signaling overhead and for simplifying a procedure is described hereinafter.

If the D1 transmits a scheduling request for D2D communication, the eNB1 and the D2 may operate to receive the scheduling request. This may be possible in a state where the D1 and the D2 are synchronized. If the synchronization is not achieved, since it may be difficult for the D2 to receive an SR transmitted by the D1, a resource for a D2D-related SR may be allocated in advance so that the D2D-related SR can be mutually received. The eNB1 which receives the SR of the D1 may transmit a confirmation signal as to whether D2D communication is possible. The confirmation signal may correspond to D2D communication activation signaling for indicating a use of a specific region among resource regions predetermined for D2D communication. The confirmation signal from the eNB1 may operate to be received simultaneously by the D1 and the D2. Alternatively, if there is no direct link of the eNB1 and the D2, the confirmation signal from the eNB1 may be delivered to the D2 via the D1.

In addition, if the eNB1 is previously aware of the D2D-related information of the eNB2, when there is a D2D communication request of the D1, the eNB1 may respond to the D1 by deciding whether D2D communication is allowed without an information exchange with the eNB2. For this, signaling for mutually exchanging information on a resource region for D2D communication between eNBs may be defined and used, and signaling by which information on a resource region for D2D communication can be delivered from at least any one eNB to another eNB may be defined and used.

4. D2D Communication and Handover

Figure 10:
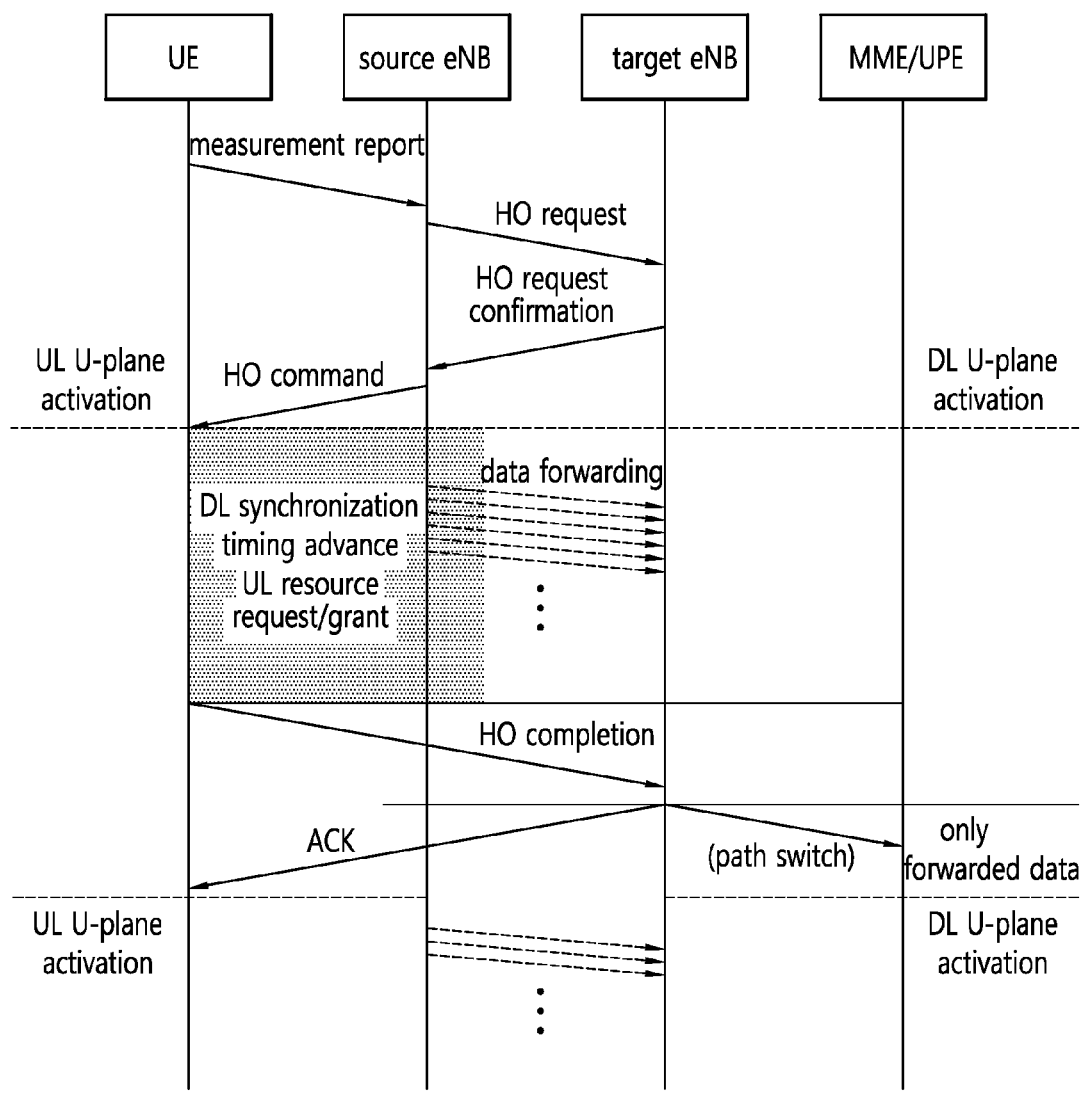
FIG. 10 shows a handover procedure applicable to the present invention.

FIG. 10 shows a handover procedure applicable to the present invention.

It is assumed in FIG. 10 that a UE executes a handover from a source eNB to a target eNB. The handover may be executed when link quality deteriorates as the UE moves from a serving eNB (e.g., source eNB). The UE may perform a measurement on the source NB and may report a result thereof. Accordingly, the source eNB may transmit a handover (HO) request message to the target eNB, may receive a HO request confirmation message for this, and thus may transmit a HO command message to the UE.

Herein, uplink data from the UE to a network may be transmitted until the HO command is received. In addition, downlink data from the network to the UE may be transmitted until the UE receives the HO command. That is, a user plane may be activated in an uplink and a downlink until the UE receives the HO command.

After the UE receives the HO command from the source eNB, the UE may perform a downlink (DL) synchronization for the target eNB, and may perform a timing coordination based on a timing advance command for adjusting UL transmission timing. Further, the UE may request a UL resource, and a UL grant may be allocated in response thereto. In the meantime, a UL user plane may be interrupted due to radio L1/L2 signaling, and data forwarding may be performed from the source eNB to the target eNB as a background process.

After the above operation is complete, the UE may transmit a HO complete message to the target eNB. In the meantime, the UL user plane may be interrupted due to UL RRC signaling. Upon receiving the HO complete message, the target eNB may update a user plane with respect to a mobility management entity (MME)/user plane entity (UPE).

Thereafter, the target eNB may transmit an ACK message to the UE, and may perform path switching with respect to the MME/UPE. In the meantime, the UL user plane may be interrupted due to DL RRC signaling. In addition, the DL user plane may be interrupted until the path switching is complete, and only data forwarded from the source eNB may be transmitted from the target eNB to the UE during the path switching. The data forwarding from the source NB to the target eNB may be continued even after the path switching is complete.

The UL user plane may be activated again when the UE receives ACK, and the DL user plane may be activated again when the path switching is complete.

In addition, the HO may be classified into a backward HO and a forward HO. The backward HO implies a mechanism in which the source eNB requests the target eNB to prepare for the HO. Herein, the target eNB generates an RRC message for an HO execution, and delivers it to the source eNB and the UE. The forward HO implies a mechanism in which the UE autonomously determines to be connected to the target cell and the UE requests to maintain the connection. In case of the forward HO, a re-establishment procedure is applied only when the UE loses the connection for the source cell. This procedure can be successful only when the target cell is prepared in advance for the HO. Meanwhile, an LTE system supports a redirection operation which implies an operation in which, when a connection release occurs in a certain UE, the UE is allowed to move to use another frequency or radio access technology (RAT).

Since a device related to D2D communication can have mobility, a HO situation may occur in the D2D communication. Hereinafter, examples of the present invention are described for correctly and effectively performing both of maintaining of the D2D communication and executing of the HO procedure when some or all of a plurality of devices related to D2D communication execute the HO.

Figure 11:
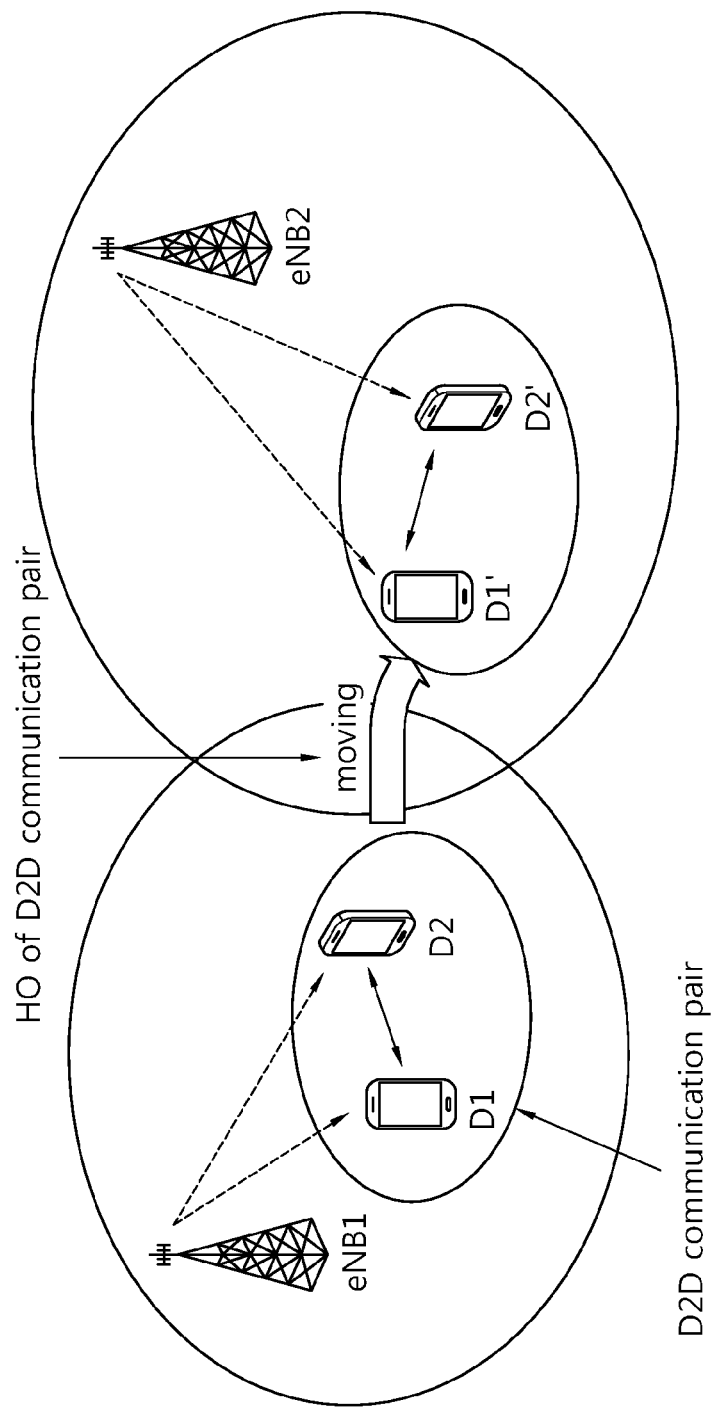
FIG. 11 shows an example in which a handover is executed by all devices for performing D2D communication.

FIG. 11 shows an example in which a handover (HO) is executed by all devices for performing D2D communication.

An example of FIG. 11 shows a case where all devices belonging to a D2D communication group (i.e., a D2D communication pair of a D1 and a D2) move to a cell of an eNB2 during D2D communication is performed between the D1 and the D2. In this case, each of the D1 and the D2 may perform a HO procedure. If the D2D communication-related information does not differ for each cell, the HO may be executed while maintaining D2D communication without separate signaling. However, if a D2D operation-related parameter differs for each cell (i.e., in case of a cell-specific parameter among a plurality of pieces of D2D communication-related information), D2D communication can be performed seamlessly only when a corresponding parameter changes from a parameter for an eNB1 to a parameter for the eNB2 during the HO procedure. Therefore, signaling for delivering a cell-specific parameter to the D1 and the D2 may be defined and used among a plurality of pieces of D2D communication-related information during the HO procedure. For example, the cell-specific D2D-related parameter may include a resource configuration for D2D communication, a transmission power configuration, whether D2D communication is allowed, whether charging related information for D2D communication is reported, etc.

As described above, if the parameter for the D2D resource configuration is semi-statically configured, the HO can be performed with seamless D2D communication only when corresponding information is shared between HO-related cells, and is also shared between the D1 and D2 performing the HO. If a cell to which the D1 and the D2 move is a cell of a relay, a resource region (i.e., a search space) for monitoring a relay control channel (i.e., an R-PDCCH) may be configured differently for each cell, and information regarding an R-PDCCH search space may be shared between cells related to a HO execution and D2D devices so that the R-PDCCH can be successfully decoded.

Figure 12:
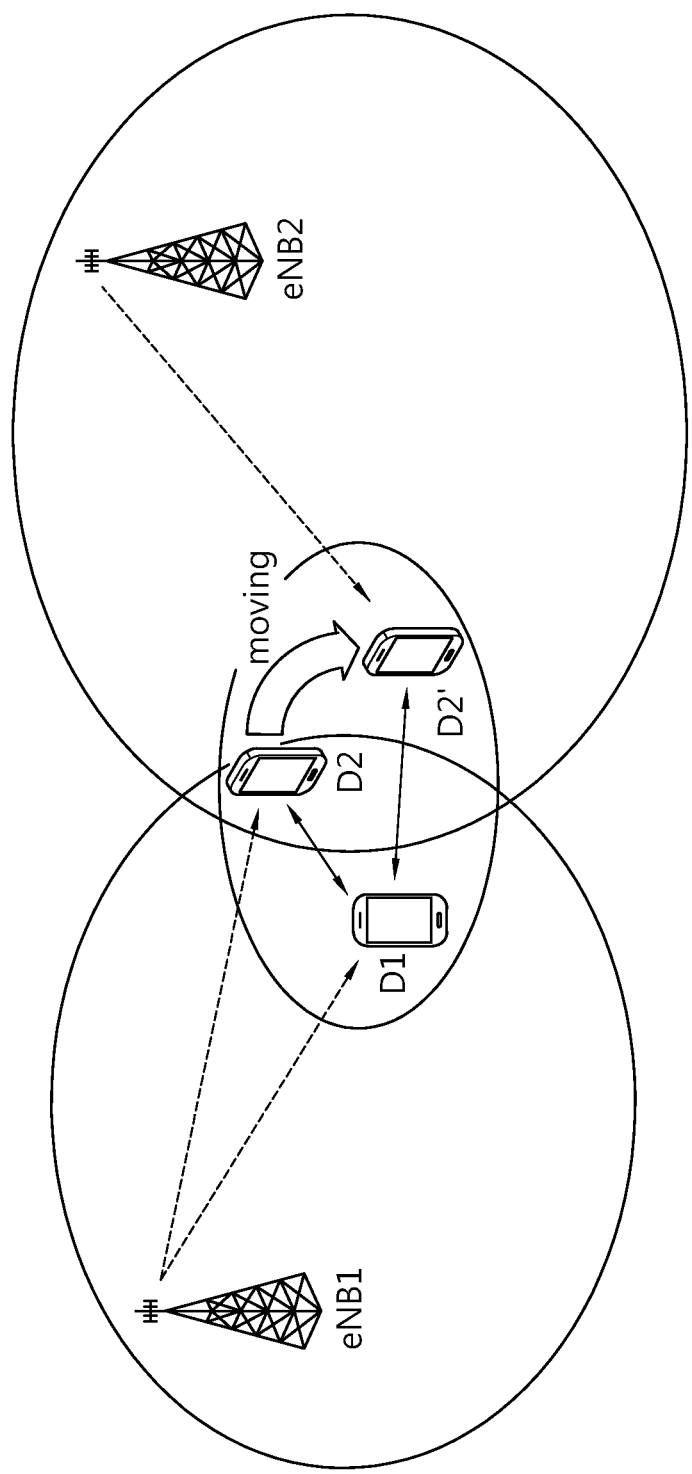
FIG. 12 shows an example in which a handover is executed by some devices for performing D2D communication.

FIG. 12 shows an example in which a handover (HO) is executed by some devices for performing D2D communication.

An example of FIG. 12 shows a case where some of devices (e.g., a D2) belonging to a D2D communication group (i.e., a D2D communication pair of a D1 and the D2) move to a cell of an eNB2 during D2D communication is performed between the D1 and the D2. In this case, the D2 must execute a HO procedure, and cell-specific information must be delivered to the D2 among a plurality of pieces of D2D communication-related information. For example, if a cell-specific D2D-related parameter such as D2D resource configuration information or the like is configured, information for specifying a cell (e.g., a cell identifier) may be reported to the D2 so that the D2 can know which resource is configured for D2D in the cell of the eNB2. Herein, a resource region configured for D2D communication in a cell of an eNB1 and a resource region configured for D2D communication in the cell of the eNB2 may be not the same resource region. In this case, the D1 and the D2 may perform D2D transmission/reception in different resource regions, and when the D1 and the D2 are located in the same cell, may perform D2D transmission/reception in the same resource region.

In this case, D2D communication after the HO execution corresponds to a case where devices related to D2D communication belong to cells of different eNBs as described in FIG. 8 and FIG. 9. Therefore, an exchange of D2D-related information is necessary as described in association with FIG. 9 during the HO. For example, if the eNB1 and the eNB2 support D2D in different manners, signaling may be defined and used such that information for changing/coordinating this may be exchanged between eNBs, and is delivered simultaneously to the D2 and the D1.

Figure 13:
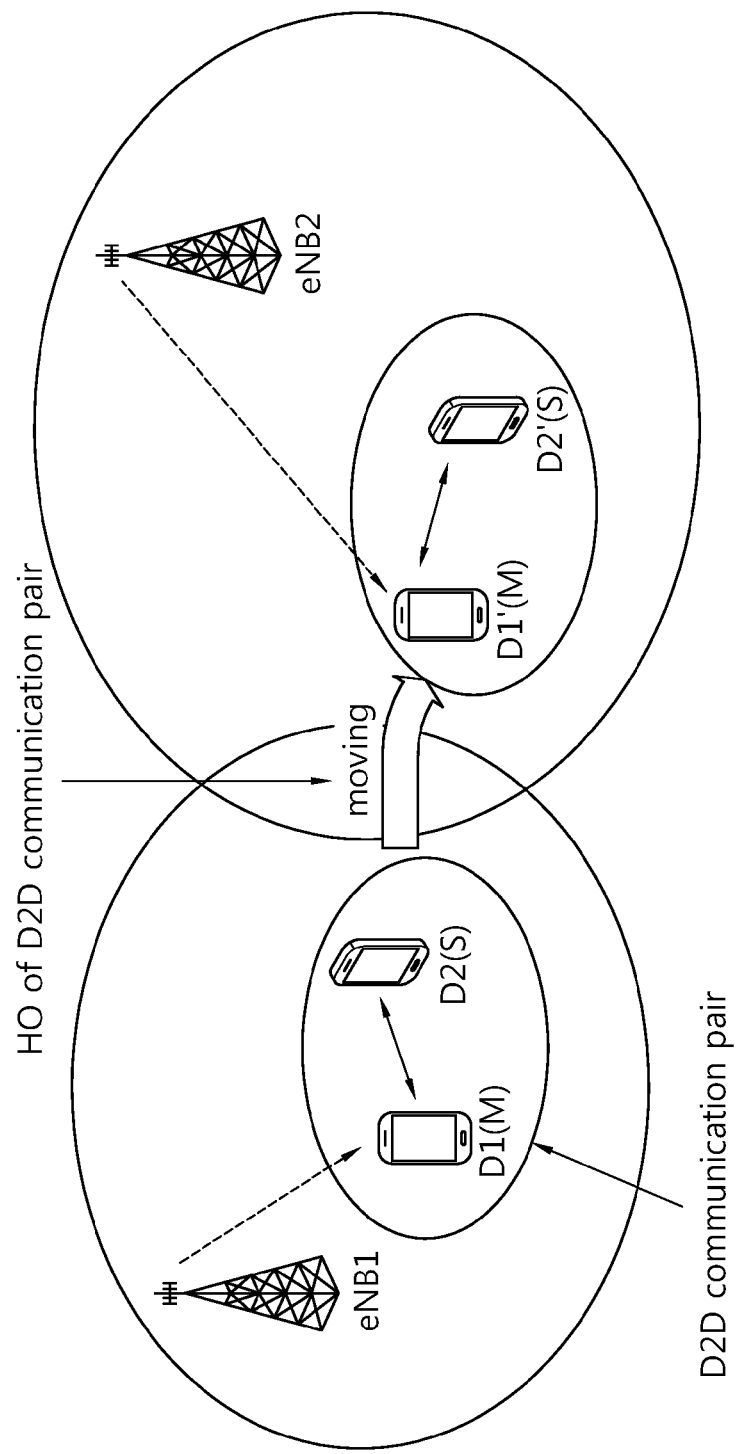
FIG. 13 shows an example of a case where all devices for performing D2D communication move together to another cell.

FIG. 13 shows an example of a case where all devices for performing D2D communication move together to another cell.

The example of FIG. 13 shows a case where a D2 does not have a direct link with an eNB, and a D1 functions as a relay between the eNB and the D2. That is, the D1 may perform D2D direction communication with the D2, and may operate as a relay as to communication between the D2 and the eNB. In this case, the D1 may be called a master, anchor, or primary device, and the D2 may be called a slave or secondary device. In FIG. 13, the D1 is denoted by M (master), and the D2 is denoted by S (slave).

An example of FIG. 13 shows a case where all of devices belonging to a D2D communication group (i.e. a D2D communication pair of a D1 and a D2) move to a cell of an eNB2 during D2D communication is performed between master and slave devices. In general, a handover (HO) must be executed when a UE moves to another cell. However, even after moving to the cell of the eNB2, the D2 may perform communication with the eNB2 via the D1 without having to perform direct communication with the eNB2. Accordingly, if the D1 successfully executes the HO even if the D2 does not execute the HO, D2D communication and communication between the eNB2 and the D2 via the D1 may be both performed without any problem.

If the D2 intends to execute an idle mode (e.g., cell selection) HO, information on the eNB2 may be provided to the D2. In addition, if the D2 intends to attach to the eNB2 as a typical UE after completing direct communication with the D1, the pre-defined cell search process including an attach process and a cell reselection operation must be performed. Herein, if the D2 is aware of information of the eNB2, a cell search process of the D2 can be performed effectively and an operation thereof can be simplified.

The present invention proposes an operation in which, if a master device (e.g., D1) and a slave device (e.g., D2) move together to a target cell while performing D2D communication, only the master device executes a HO in practice, but the master device delivers received target cell information, that is, HO-related information, to the slave device. Accordingly, when the slave device performing D2D communication transitions from a D2D direct communication mode to a normal indirection communication mode, a delay in a cell selection or cell search process can be decreased and an effective operation can be performed.

Herein, the HO-related information implies information required by the UE to operate in the target cell. For example, the HO-related information may include information specifying the target cell (e.g., a cell ID), information on a radio bearer provided by the target cell (e.g., quality of service (QoS) information, etc.), resource configuration information provided by the target cell, a new temporary identifier that can be used by the UE in the target cell (e.g., target C-RNTI), etc. In addition, the HO-related information of the target cell may include cell-specific D2D related information required to perform D2D communication in the target cell (e.g., a resource configuration for D2D communication in the target cell, a transmission power configuration, whether to allow D2D communication, whether to report charging-related information on D2D communication, etc.).

In addition, the HO-related information may be exchanged and shared between cells (i.e., a source cell and a target cell) which are involved in the HO. For example, the source cell may acquire the HO-related information of the target cell during the HO procedure. In addition, for example, the source cell and the target cell may acquire mutual HO-related information similarly to signaling for requesting and providing D2D communication-related information in steps S1220 and S1240 of FIG. 9 described above. The source cell may directly deliver HO-related information of the target cell to the master and slave devices performing D2D communication, or may deliver it to the slave device via the master device.

In addition, in order to support seamless D2D communication in a situation where a service area changes while performing D2D communication in general, it may be considered that devices participating in D2D communication compulsively execute the HO to the same cell. This is to prevent D2D communication from being implemented in a complex or difficult manner due to a different cell-specific parameter (e.g., a resource configured for D2D communication) when the devices participating in D2D communication belong to different cells. As such, if a target cell is restricted to the same cell when the devices performing D2D communication execute the HO, a method of delivering HO-related information of the target cell to the slave device as proposed in the present invention can be usefully applied in particular.

Hereinafter, in a case where all devices performing D2D communication move together to another cell, a method of acquiring a parameter and/or information required for a HO of a D2 via a D1 is described in greater detail.

Referring back to FIG. 13, the D1 and the D2 execute a HO together to a cell served by an eNB2. In this case, the D1 may preferentially execute the HO and may deliver HO information acquired in this process to the D2. Accordingly, the D2 may execute a simplified HO at a later time.

Figure 14:
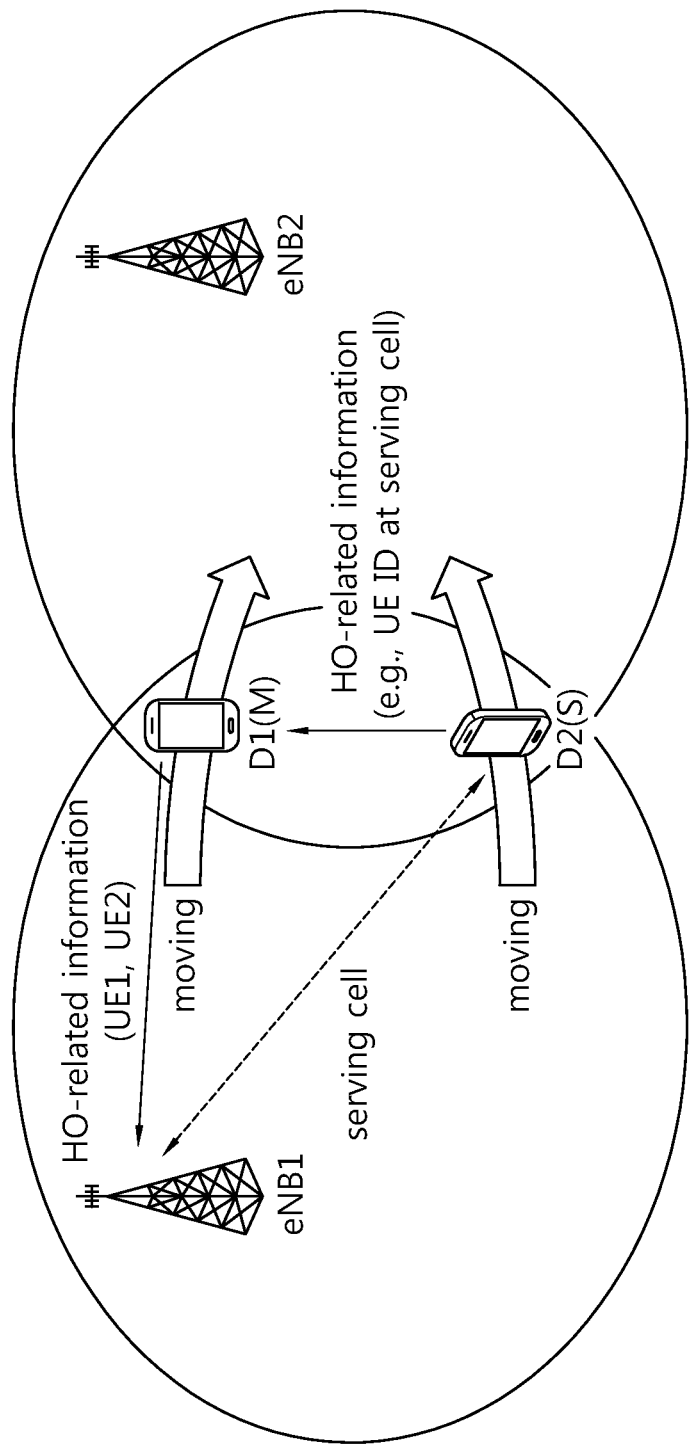
FIG. 14 and FIG. 15 show the concept of delivering handover-related information according to an embodiment of the present invention in the example of FIG. 13.
Figure 15:
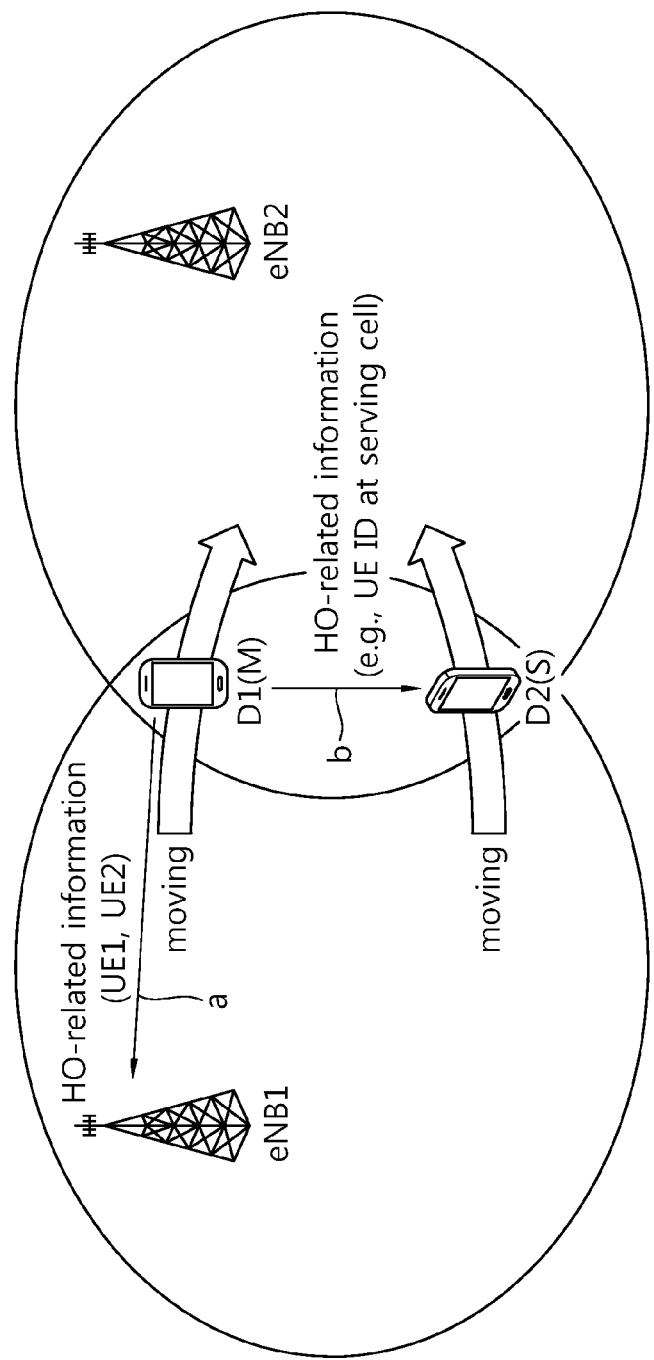

FIG. 14 and FIG. 15 show the concept of delivering HO-related information according to an embodiment of the present invention in the example of FIG. 13.

First, a D1 must deliver information on a D2 which intends to execute a HO to a network together. Therefore, the D1 may transmit the information on the D2 to an eNB1 before the HO execution, or may transmit the information on the D2 to the eNB1 after the HO execution (see FIG. 14).

The information on the D2 may include the following content.
- Physical cell ID (PCI) of HO target cell
- ID (e.g., C-RNTI) used by D2 at current serving cell (i.e., HO source cell)
- Physical layer ID of current serving cell (i.e., HO source cell)
- Extra information provided by UE to eNB in HO procedure.

When the D1 is aware of information regarding the D2 and required in the HO procedure, the information may be directly transmitted to the eNB1. Otherwise, the D1 acquires the information from the D2 and transmits it to the eNB1. In this case, an information flow is 'D2→D1→network (eNB1)'.

When the information regarding the D2 is transmitted to the eNB1 before the D1 executes the HO, the information may be transmitted by being included in a measurement report message. When the information regarding the D2 is transmitted to the eNB1 during the HO procedure or after the D1 performs the HO, the information may be transmitted in a DL synchronization, timing coordination, or UL resource request process.

Meanwhile, if a fact that the D1 assists the HO of the D2 is known to a network (or eNB1), the eNB1 may deliver information, which is required when the HO for the D2 is executed in a state where the assistance of the D1 is present, to the D2 via the D1 (see FIG. 15a). This information may also be delivered by the D1 before the HO execution, during the HO procedure, or after the HO execution, and may include the following content.
- ID (e.g., C-RNTI) to be used by D2 at HO target cell
- Security algorithm ID of eNB2
- Dedicated random access channel (RACH) preamble
- SIB of eNB2
- Extra information provided by eNB to UE in HO procedure If information regarding the D2 is transmitted to the eNB1 before the D1 executes a HO, the information may be transmitted in a HO command message (e.g., RRCConnectionReconfiguration).

The D1 may deliver information required for the HO of the D2 to the D2 by adding information acquired by the D1 to information received from the network (see FIG. 15b). Optionally, information may be updated or added/deleted, and the following content may be included.
- Handover command (e.g., RRCConnectionReconfiguration) indicating D2 to execute HO
- PCI (physical cell ID) of HO target cell
- ID (e.g., C-RNTI) to be used by D2 at HO target cell
- Security algorithm ID of eNB2
- Dedicated RACH (random access channel) preamble
- Handover target cell acquired by D1 during HO procedure or after HO, that is, SIB (e.g., MIB) of eNB2
- Timing advance (TA) value or its approximate value used in UL transmission by D1 at target cell
- Extra information provided by eNB to UE in HO procedure In this case, an information flow is 'network (eNB1)→D1→D2'.

If information required for the HO can be received from the D1, the D2 may skip many procedures when executing the HO. For example, a procedure of acquiring its ID to be used by the D1 at a HO target cell, an ID of a target cell, and system information may be skipped. Accordingly, the D2 may perform a reception operation (e.g., PDCCH monitoring) for a DL channel or a target cell without having to perform communication with the eNB2 separately, and may receive resource allocation information including DCI for scheduling UL/DL signal transmission from the eNB2.

Figure 16:
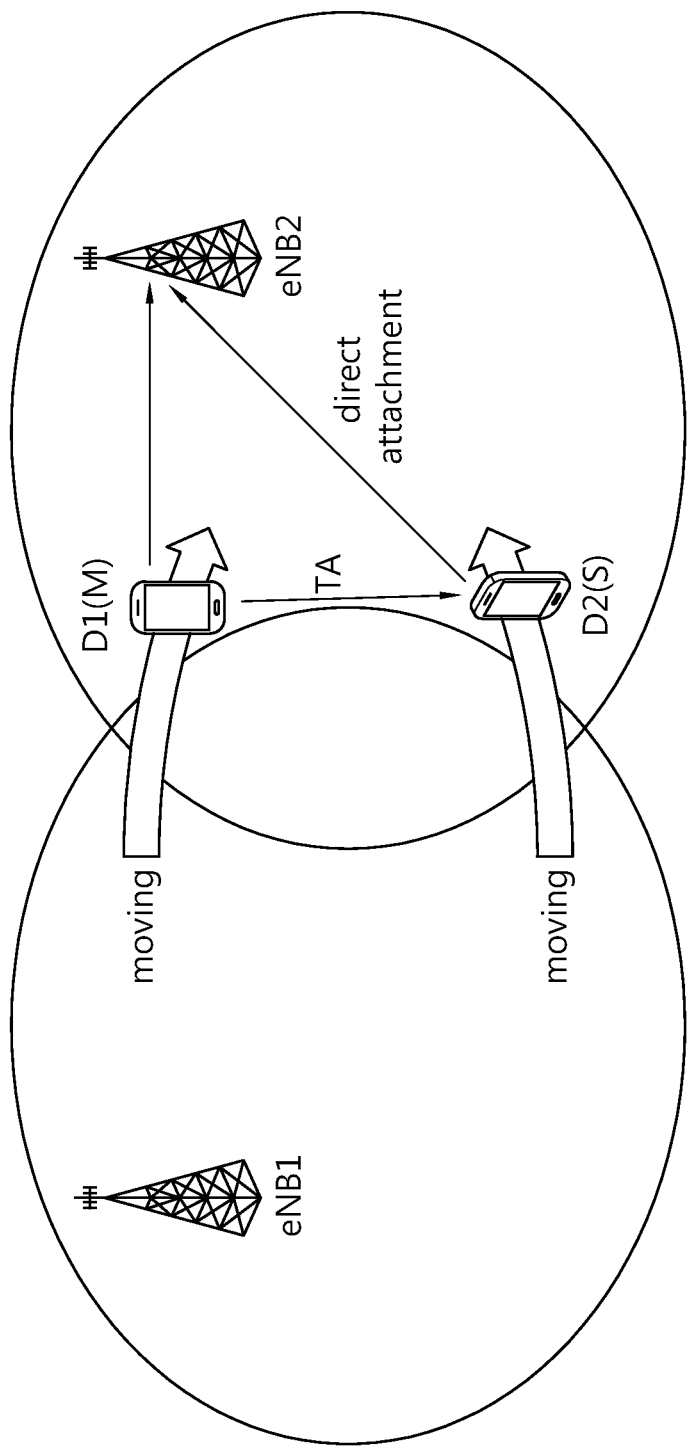
FIG. 16 shows the concept of a direct initial access according to an embodiment of the present invention in the example of FIG. 13.

Meanwhile, the D2 must transmit UL ACK/NACK for the PDSCH transmitted by the target cell or transmit the PUSCH according to a UL grant of the target cell. The UL transmission requires a timing advance value. The timing advance value may be acquired by the D2 directly from the target cell, which causes an additional delay. Accordingly, the present invention proposes a method in which the D2 uses the timing advance value used by the D1. That is, since D2D communication is achieved between adjacent UEs in general, the timing advance value used by the D1 is delivered to the D2, and is used as a timing advance value of the D2. An error part caused by a difference between the D1 and the D2 may be corrected through a communication process with respect to the eNB2 at a later time. FIG. 16 shows the concept of a direct initial access according to an embodiment of the present invention in the example of FIG. 13.

Referring to FIG. 16, a D2 performs a direct attachment (e.g., PDCCH monitoring) in a HO procedure on the basis of system information acquired from a D1, an ID to be used by the D2 in the HO target cell, etc. In this case, the D2 may acquire a timing advance value used by the D1 from the D1 and may directly use it as its timing advance value, or may use the value by correcting it.

For example, if the D1 delivers reference signal received power (RSRP) of the eNB2, the D2 may compare eNB2 RSRP measured by the D2 with eNB2 RSRP measured by the D1, and may correct the timing advance value used by the D1 on the basis of the comparison result. Under the assumption that two UEs have the same shadowing environment, if the RSRP measured by the D2 is greater than the RSRP measured by the D1, it can be seen that the D2 is located closer to the eNB than the D1. Therefore, the timing advance value used by the D1 may be used by slightly decreasing the value.

Figure 17:
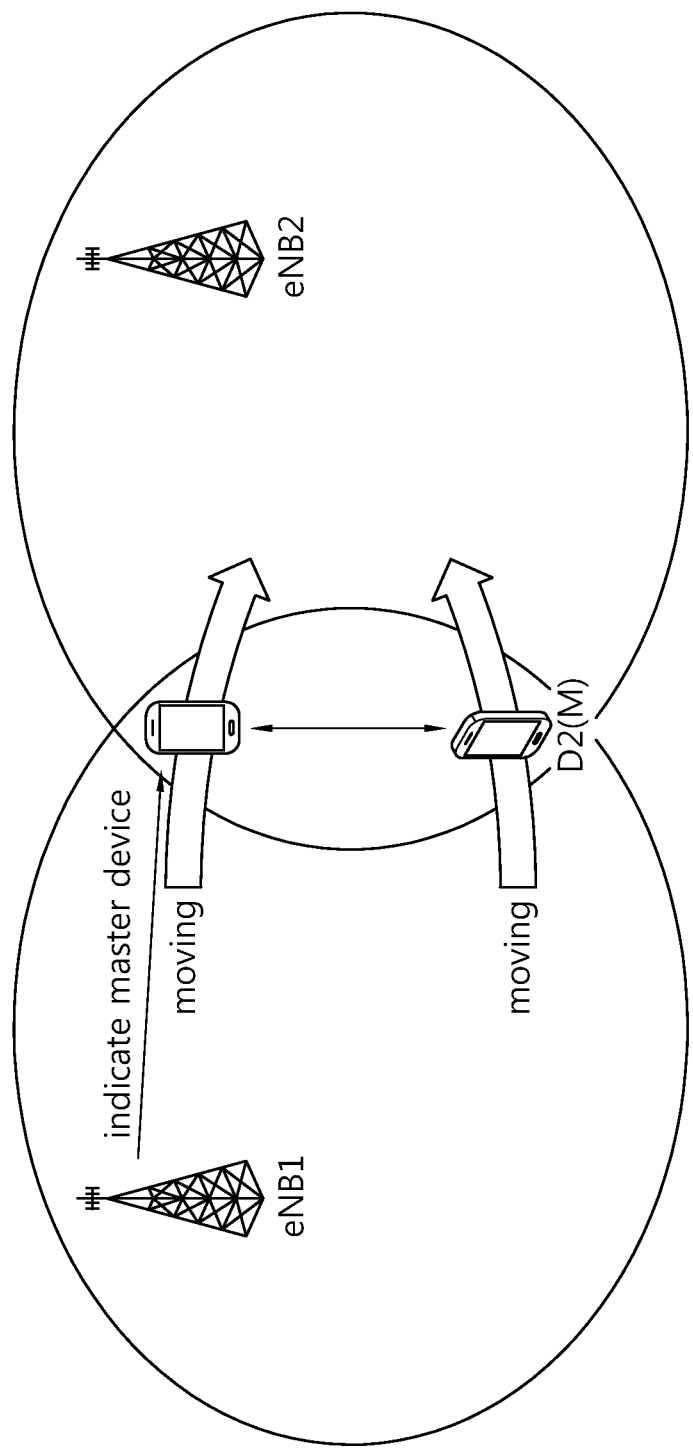
FIG. 17 shows the concept of a method of indicating a master device of D2D communication according to an embodiment of the present invention.

In order for one UE to assist a HO of another UE in a D2D communication group as described above, it is necessary to determine a master device. FIG. 17 shows the concept of a method of indicating a master device of D2D communication according to an embodiment of the present invention.

As an example of the method of indicating the master device, while transmitting a HO command to a specific UE, a network may indicate that a UE which receives the HO command is a master device. For example, a HO command message may include a field (or flag) indicating to become the master device. In addition, it may be indicated to report a list of a UE (i.e., a counterpart of D2D communication) in motion and adjacent to the specific UE.

In addition, if UEs belonging to a D2D communication group are known, in a case where a signal of a specific UE changes in strength/quality (due to an event of moving or the like), an eNB may recognize and predict whether a HO of the specific UE is necessary, and may determine a suitable UE among UEs belonging to a D2D communication group as the master device.

As an example of the method of determining the master device, the eNB may determine the master device by selecting a UE which is suitable for the master device, for example, a UE having a low mobility, a UE which has a great amount of data transmitted/received with respect to a network, a UE which satisfies a specific condition (e.g., existing in an intermediate location geographically, having a high performance) among UEs which belong to a D2D communication group, etc. In addition, if the UE which is determined as the master device is a UE which has a great number of slave devices when it becomes the master device, the UE may experience a great signaling overhead to perform D2D communication with a slave device and to assist a HO execution of the slave device. Therefore, the eNB may determine a UE, which will have a small number of slave devices when it is determined as the master device, as the master device. On the contrary, even though a UE will have a great number of slave devices when it becomes the master device, if the UE has a higher performance to overcome the aforementioned overhead, the UE may be determined as the master device.

Although an example in which both of two UEs performing D2D communication execute a HO is described above, this is for exemplary purposes only. That is, a D2D communication group may include two or more UEs. One UE may execute a HO by representing the master device, and may deliver information required to the HO to the other UE.

Figure 18:
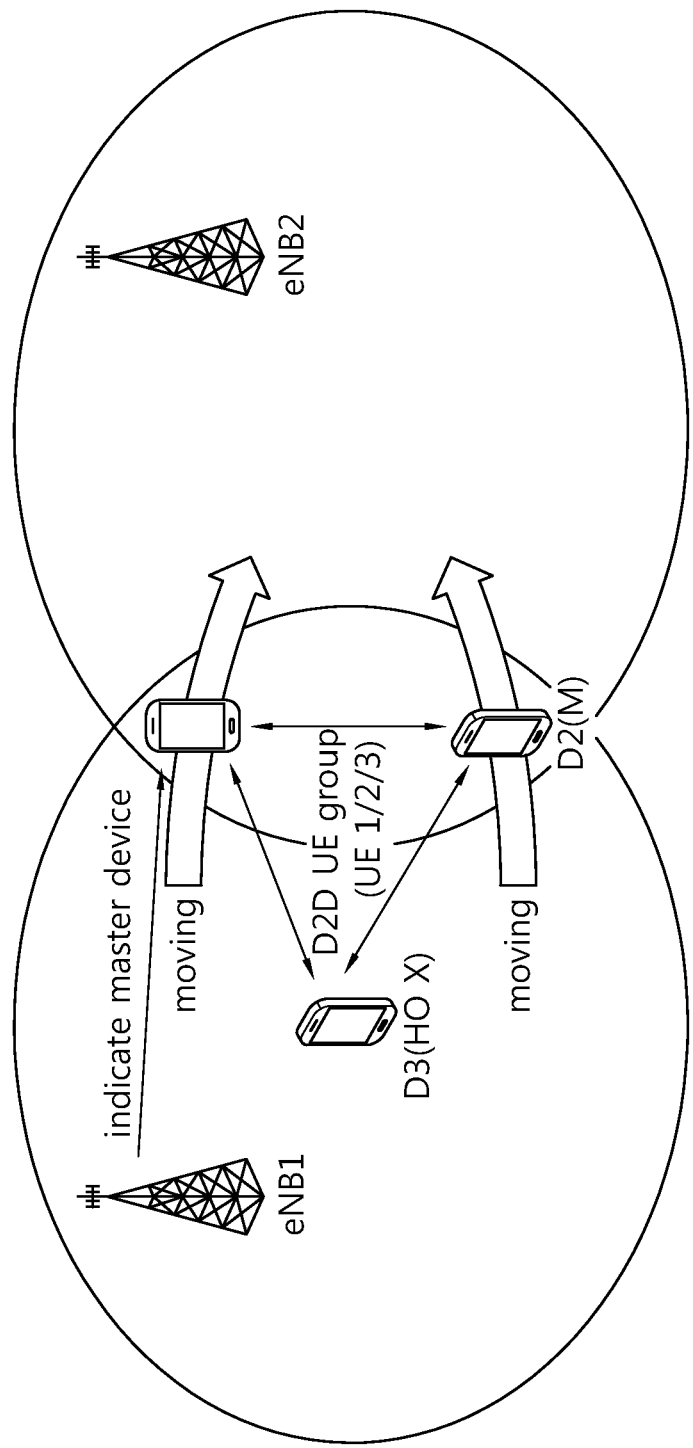
FIG. 18 shows an example of a case where only two user equipments (UEs) execute a handover to a cell of an eNB2 during three UEs perform D2D communication.

FIG. 18 shows an example of a case where only two UEs execute a HO to a cell of an eNB2 during three UEs perform D2D communication.

Referring to FIG. 18, among three UEs belonging to a D2D communication group, only two UEs require the HO. That is, there may be a case where, while a UE1, a UE2, and a UE3 perform D2D communication with each other, the UE1 and the UE2 may execute the HO according to a mobility whereas the UE3 stays in its position and thus does not execute the HO. Therefore, the HO may be executed by selecting only a UE which requires the HO from a UE group which performs D2D communication. In this case, if two or more UEs require the HO, as described above, the HO may be executed by determining a master device.

Figure 19:
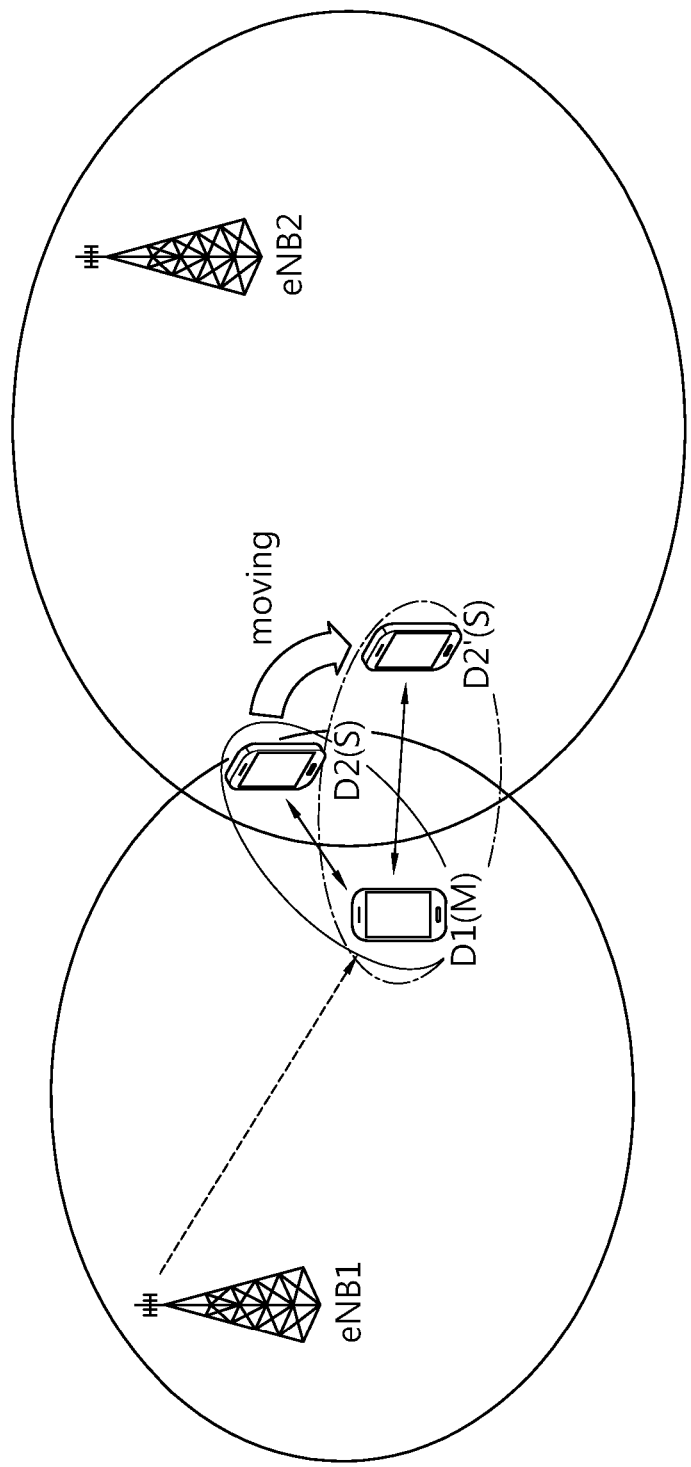
FIG. 19 shows an example of a case where some of devices for performing D2D communication move to another cell.

FIG. 19 shows an example of a case where some of devices for performing D2D communication move to another cell.

It is assumed in the example of FIG. 19 that a D1 and a D2 perform D2D communication, the D1 is a master device which plays a role of a relay with respect to the D2, and the D2 is a slave device as in the example of FIG. 13. However, the example of FIG. 19 shows a case where some of devices (e.g., a D2) belonging to a D2D communication group (i.e., a D2D communication pair of a D1 and the D2) move to a cell of an eNB2 during D2D communication is performed between the D1 and the D2. Although the D2 must execute a HO to a target cell (i.e., the cell of the eNB2) in a normal case, since the D2 which is a slave device is in a state of receiving a service from the eNB1 via the D1, the HO is not immediately required even if it moves to the target cell.

In this case, if the D2 must operate as a typical UE after finishing D2D communication, a cell search procedure or the like including an attach procedure and a cell reselection operation must be performed on the eNB2. Herein, if the D2 is aware of information of the eNB2 (e.g., HO-related information), a delay in the cell search or the like may be decreased, and an operational efficiency may be increased.

Accordingly, the present invention proposes a method in which the D1 acquires HO-related information regarding the eNB2 and delivers it in advance to the D2. Since the D1 is located in a current cell of the eNB1, it is not necessary to execute a HO to the eNB2. However, if the D1 recognizes a state of the D2 which moves to the eNB2, an operation of acquiring the HO-related information of the eNB2 may be performed. For example, the D1 may not execute the HO to the eNB2 in practice, but may acquire the HO-related information on the eNB2 by requesting the HO to the eNB2. The D1 may not execute the HO to the eNB2 even if the HO-related information of the eNB2 is acquired. Such a HO procedure may be called a virtual HO procedure. That is, the D1 may deliver to the D2 the eNB2 HO-related information acquired by the D1 by executing a virtual HO on the eNB2. Accordingly, a time consumed when the D2 is attached to the eNB2 and an unnecessary procedure or the like can be decreased.

In addition, it may be considered a case where measurement information of the D2 is delivered to the eNB via the D1. As a typical UE operation, the D2 may measure reception signal strength (e.g., reference signal received power (RSRP)) from each eNB and may perform a cell reselection procedure or the like. In this case, if the D2 performs communication with eNBs by being dependent on the D1, measurement information such as RSRP measured by the D2 may be delivered to the eNB1 via the D1. That is, although a downlink measurement performed by the D2 is for a direct link from each eNB, the measurement information measured by the D2 may be fed back to the eNB1 by using a relay function of the D1. In this procedure, it may be recognized that the D1 moves to a cell of the eNB2 from the measurement information of the D2, and as described above, an operation of acquiring HO-related information for the eNB2 and delivering it to the D2 may be performed as described above.

In addition, as an additional method in which the D2 acquires information on the eNB2, it is proposed a method of swapping a role between D2D devices. That is, during the D1 which operates as a master device and the D2 which operates as a slave device perform D2D communication in a cell of the eNB1, if the D2 moves to the cell of the eNB2, the D2 and the D1 may be swapped respectively to the master device and the slave device. Accordingly, the D2 may execute a HO in practice with respect to the eNB as the master device, and the D1 may receive a service by the eNB2 via the D2 as the slave device. As a result, the D2 can acquire directly the HO-related information of the eNB2, and the D1 has information of the eNB1 in which the D1 is previously located. Therefore, an operation in which the D1 which is the slave device after D2D communication is complete is attached to the cell of the eNB1 can be simplified. Alternatively, if a D2D device is restricted to operate in the same cell (i.e., a cell of the eNB2) after the D1 is swapped as the slave device, the D1 may receive the HO-related information regarding the eNB2 from the D2 which is the master device and thus may execute an operation of a HO to the eNB2 without a latency. Such a principle of the present invention can be expressed differently such that, in D2D communication, only a master device (or a primary device) executes a HO and a slave device (or a secondary device) executes the HO by using HO-related information delivered from the master device.

In addition, the HO which occurs during D2D communication is performed may be restricted to be executed always in a forward HO manner. That is, it is important for UEs performing D2D not to miss an incoming call, and since this can be supported through paging, it may be preferably configured such that, as to the UE performing the D2D communication, only a forward HO initiated by the UE instead of a backward HO initiated by a request of the eNB is executed. In addition, in case of using a D2D dedicated resource (e.g., a frequency resource), an eNB which receives a scheduling request for D2D communication from the D2D UE may allow the D2D UEs to compulsively move to use a different frequency or a different RAT through a redirection command.

Figure 20:
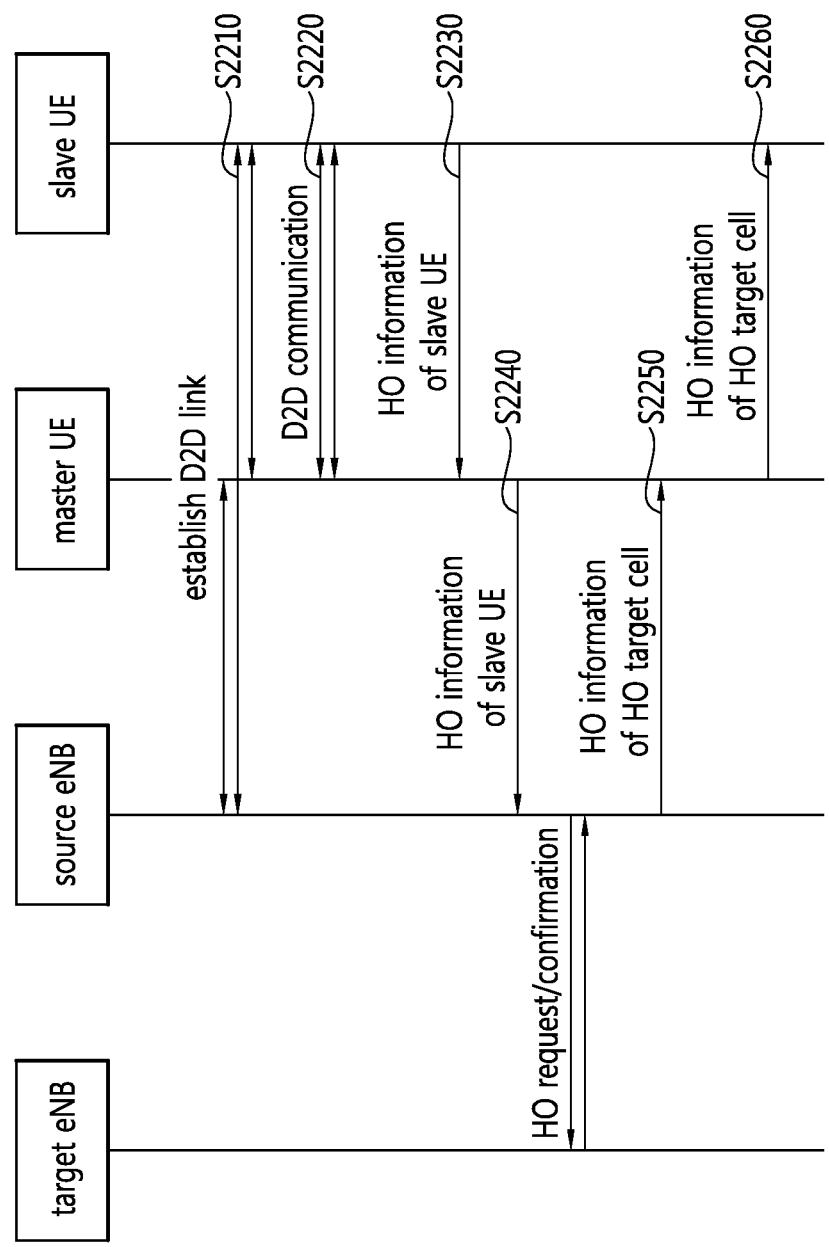
FIG. 20 is a flowchart showing an example of a D2D communication method according to the present invention.

FIG. 20 is a flowchart showing an example of a D2D communication method according to the present invention.

As described above, D2D communication implies direct communication between UEs. The UEs which perform the D2D communication may also be called a $1^{st}$ UE and a $2^{nd}$ UE, and according to a role in the D2D communication, may be called either a master UE/slave UE or a primary UE/secondary UE. It is assumed in the example of FIG. 20 that the $1^{st}$ UE is a master UE, and the $2^{nd}$ UE is a slave UE. Although it is exemplified herein that the D2D communication group includes only two UEs, i.e., the $1^{st}$ UE and the $2^{nd}$ UE, the D2D communication group may include two or more slave UEs. The master UE may perform a relay function between the slave UE and an eNB (or cell). In addition, a measurement result on the slave UE may be fed back to the eNB (or cell) via the master UE.

In step S2210, the master UE establishes a D2D link with the slave UE. The D2D link may be configured in such a manner that the master UE transmits a request message for connecting a D2D link to the eNB of the current serving cell, the eNB transmits a PDCCH order in response to the request message, and the master UE performs PRACH transmission based on the PDCCH order to the slave UE. The request message may include an identifier of a counterpart UE of the D2D communication, i.e., the slave UE. In addition, the PDCCH order may be defined for a dedicated D2D usage for initiating D2D communication. For example, a specific field of the existing PDCCH may be modified to indicate PRACH transmission for D2D communication. When the master UE transmits a random access preamble through a PRACH, the slave UE transmits a random access response in response thereto, and the master UE establishes a D2D link on the basis thereof.

In step S2220, the master UE and the slave UE perform the D2D communication. A current serving cell of the master UE and the slave UE is a source cell of a HO procedure at a later time.

In step S2230, the master UE receives HO information from the slave UE. The HO information of the slave UE may include a UE identifier (e.g., C-RNTI) used by the slave UE in the current serving cell. In addition, the HO information of the slave UE may include information provided by the UE to the eNB in a HO procedure, such as a PCI of a HO target cell and a physical layer ID of the current serving cell. If the master UE executes the HO together with the slave UE, information overlapping with the HO information of the slave UE may be omitted.

In step S2240, the master UE transmits the HO information of the slave UE to the eNB of the current serving cell. If the master UE executes the HO together with the slave UE, HO information of the master UE may also be transmitted together. If only the slave UE executes the HO, the master UE may perform a virtual HO procedure.

In step S2250, the master UE receives information of a HO target cell from the current serving cell. The information of the HO target cell may include a user identifier (e.g., C-RNTI) to be used by the slave UE in the HO target cell. In addition, the information of the HO target cell may include a dedicated RACH preamble of the HO target cell and information provided by the eNB to the UE in the HO procedure, such as system information. The step S2250 may be performed when the master UE or the slave UE moves to the HO target cell or when the master UE stays at the HO source cell but the slave UE moves to the HO target cell. The master UE may acquire HO-related information of the HO target cell by actually executing the HO, and may not move to the HO target cell but may stay at the current serving cell to acquire the HO-related information through the virtual HO procedure.

In step S2260, the master UE transmits the information of the HO target cell to the slave UE. The master UE may deliver the information related to the HO and acquired by the master UE to the slave UE together with the HO target cell information received from the current serving cell in step S2250. Optionally, the information may be updated or added/deleted, and may include a HO command which indicate the slave UE to execute a HO to the HO target cell and a PCI of the HO target cell. In addition, the master UE may deliver a timing advance value used by the master UE in the HO target cell.

Aspects described in the aforementioned various embodiments of the present invention can be applied independently or two or more embodiments thereof can be simultaneously applied, and redundant content is omitted for clarity.

Figure 21:
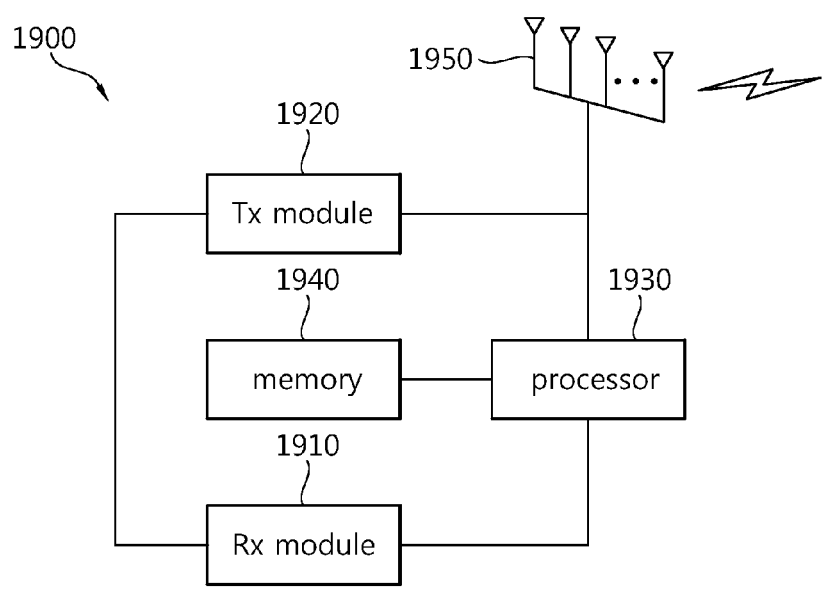
FIG. 21 shows a structure of a transmission/reception device according to an embodiment of the present invention.

FIG. 21 shows a structure of a transmission (Tx)/reception (Rx) device according to an embodiment of the present invention.

Referring to FIG. 21, a Tx/Rx device 1900 of the present invention may include an Rx module 1910, a Tx module 1920, a processor 1930, a memory 1940, and a plurality of antennas 1950. The plurality of antennas 1950 imply Tx/Rx devices supporting MIMO Tx/Rx. The Rx module 1910 may receive various signals, data, and information from an external device. The Tx module 1920 may transmit various signals, data, and information from the external device. The processor 1930 may control an overall operation of the Tx/Rx device 1900.

The Tx/Rx device 1900 according to the embodiment of the present invention may be configured as a device for performing D2D communication. The processor 1930 of the Tx/Rx device 1900 may be configured such that the Tx/Rx device 1900 performs communication through a D2D link with respect to a different Tx/Rx device in a first cell. In addition, the processor 1930 may be configured to acquire HO-related information of a second cell. In addition, the processor 1930 may be configured to deliver the acquired HO-related information of the second cell to the different Tx/Rx device by using the Tx module 1920.

In addition, the processor 1930 of the Tx/Rx device 1900 may perform a function for arithmetic processing of information received by the Tx/Rx device 1900, information to be transmitted to the external device, etc. The memory 1940 may store the arithmetic-processed information or the like during a specific time, and may be replaced with a constitutional element such as a buffer (not shown).

A detailed structure of the Tx/Rx device 1900 described above may be implemented such that aspects described in the aforementioned various embodiments of the present invention can be applied independently or two or more embodiments thereof can be simultaneously applied. Redundant content is omitted for clarity.

The aforementioned embodiments and modifications can be implemented through various means. For example, the embodiments of the present invention can be implemented in hardware, firmware, software, combination of them, etc.

In case of the hardware implementation, the method according to the embodiments of the present invention can be implemented by one or more application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

In case of the firmware or software implementation, the method according to the embodiments of the present invention can be implemented in a form of a module, procedure, function, or the like for performing the aforementioned functions or operations. A software code may be stored in a memory unit and may be driven by a processor. The memory unit may be located inside or outside the processor, and may exchange data with the processor by using well-known various means.

A detailed description on exemplary embodiments of the present invention described above is provided to allow a person skilled in the art can realize and implement the present invention. Although the present invention has been described in connection with the exemplary embodiments of the present invention, it can be understood by those skilled in the art that the present invention can be variously modified and changed without departing from the technical spirit of the present invention defined by the appended claims. For example, those ordinary skilled in the art will be able to implement the invention by combining respective structures described in the aforementioned embodiments. Therefore, the present invention is not intended to be limited to the embodiments shown herein but is to be accorded the widest scope consistent with the principles and novel features disclosed herein.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which come within the equivalent scope of the invention are included in the scope of the invention. The present invention is not intended to be limited to the embodiments shown herein but is to be accorded the widest scope consistent with the principles and novel features disclosed herein. In addition, an embodiment can be configured by combining claims failing to have relation of explicit citation in the appended claims together or can be included as new claims by amendment after filing an application.

What is claimed is:

1. A method for performing device-to-device (D2D) communication in a wireless communication system, the method comprising:
    establishing, by a master user equipment (UE), a D2D link with a slave UE;
    performing, by the master UE, the D2D communication with the slave UE through the D2D link;
    receiving, by the master UE from the slave UE, handover information of the slave UE;
    transmitting, by the master UE to a base station of a handover source cell, the handover information of the slave UE;
    receiving, by the master UE from the base station of the handover source cell, a handover command message; and
    transmitting, by the master UE to the slave UE, handover information of the handover target cell,
    wherein the handover information of the handover target cell contains a timing advance value for the handover target cell of the master UE, and
    wherein the handover command message is a radio resource control (RRC) connection reconfiguration message, which includes D2D related information between the master UE and the slave UE.

2. The method of claim 1, wherein the handover information of the slave UE contains a UE identifier (ID) which is used by the slave UE in the handover source cell.

3. The method of claim 2, wherein the UE ID is a cell-radio network temporary identifier (C-RNTI).

4. The method of claim 1, wherein the handover command message includes handover information of a handover target cell.

5. The method of claim 4, wherein the handover information of the handover target cell contains a UE ID which is used by the slave UE in the handover target cell.

6. The method of claim 1, wherein the handover information of the handover target cell contains a physical cell ID of the handover target cell.

7. The method of claim 1, wherein the establishing of the D2D link comprises:
    transmitting, by the master UE to the base station of the handover source cell, a request message for a connection of the D2D link, wherein the request message contains a UE ID which is used by the slave UE in the handover source cell;
    receiving, by the master UE from the base station of the handover source cell, a physical downlink control channel (PDCCH) order in response to the request message;
    transmitting, by the master UE to the slave UE, a random access preamble through a physical random access channel (PRACH) on the basis of the PDCCH order; and
    receiving, by the master UE from the slave UE, a response for the random access preamble.

8. A user equipment (UE) for performing device-to-device (D2D) communication with a slave UE in a wireless communication system, the UE comprising:
    a reception module for receiving a signal from an external device;
    a transmission module for transmitting the signal to the external device; and
    a processor that:
    establishes a D2D link with the slave UE;
    performs the D2D communication with the slave UE through the D2D link;
    controls the reception module to receive, from the slave UE, handover information of the salve UE;
    controls the transmission module to transmit, to a base station of a handover source cell, the handover information of the slave UE;
    controls the reception module to receive, from the base station of the handover source cell, a handover command message; and
    controls the transmission module to transmit, to the slave UE, handover information of the handover target cell,
    wherein the handover information of the handover target cell contains a timing advance value for the handover target cell of the master UE, and
    wherein the handover command message is a radio resource control (RRC) connection reconfiguration message, which includes D2D related information between the UE and the slave UE.

9. The UE of claim 8, wherein the handover information of the slave UE contains a UE identifier (ID) which is used by the slave UE in the handover source cell.

10. The UE of claim 8, wherein the handover command message includes handover information of a handover target cell.

11. The UE of claim 10, wherein the handover information of the handover target cell contains a UE ID which is used by the slave UE in the handover target cell.

12. The UE of claim 8, wherein the handover information of the handover target cell contains a physical cell ID of the handover target cell.

* * * * *